US012754068B2

(12) United States Patent
Qasymeh et al.

(10) Patent No.: US 12,754,068 B2
(45) Date of Patent: Oct. 6, 2026

(54) DUAL-BAND OPTICAL ANTENNA FOR SUBWAVELENGTH WIRELESS NETWORKS

(71) Applicant: Abu Dhabi University, Abu Dhabi (AE)

(72) Inventors: Montasir Yousof Abdallah Qasymeh, Abu Dhabi (AE); Kola Thirupathaiah, Hyderabad (IN)

(73) Assignee: Abu Dhabi University, Abu Dhabi (AE)

(*) Notice: Subject to any disclaimer, the term of this patent is extended or adjusted under 35 U.S.C. 154(b) by 210 days.

(21) Appl. No.: 18/754,106

(22) Filed: Jun. 25, 2024

(65) Prior Publication Data

US 2025/0389581 A1 Dec. 25, 2025

(51) Int. Cl.
*G01J 1/42* (2006.01)
*G01J 1/04* (2006.01)
*G01J 1/10* (2006.01)

(52) U.S. Cl.
CPC .......................................... *G01J 1/42* (2013.01)

(58) Field of Classification Search
CPC .................... G01J 1/42; G01J 1/10; G01J 1/04
See application file for complete search history.

(56) References Cited

U.S. PATENT DOCUMENTS 11,011,942 B2 * 5/2021 Liu .......................... H01Q 9/40
2013/0335280 A1 * 12/2013 Chen, III ............... H01Q 21/30
343/745

FOREIGN PATENT DOCUMENTS

WO WO-2008085552 A2 * 7/2008 ......... H01Q 15/0086

* cited by examiner

*Primary Examiner* — Uzma Alam
*Assistant Examiner* — Fani Plyzos Boosalis

(57) ABSTRACT

A device including three concurrent dual-band optical antennas. A first antenna is designed with two simultaneous optical center frequencies at 187 THz and 230 THz with a total length L=3.830 μm. A second and third antenna are designed at two simultaneous center frequencies at 187 THz and 230 THz with different total lengths of the antennas L=3.820 μm and L=3.800 μm, respectively.

4 Claims, 34 Drawing Sheets

(c)

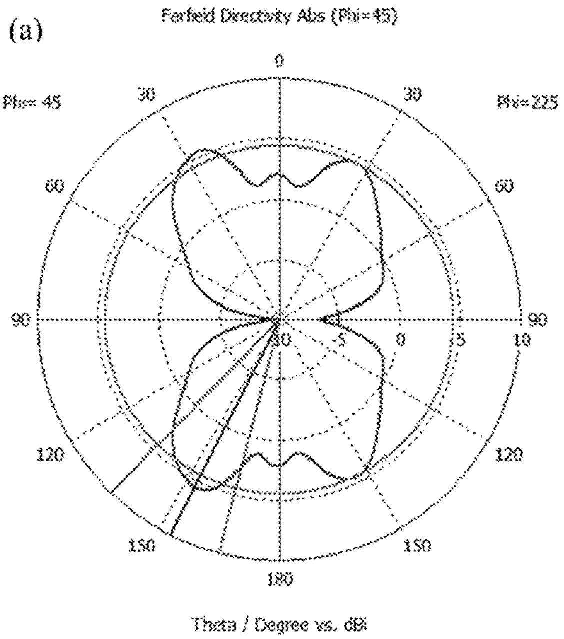
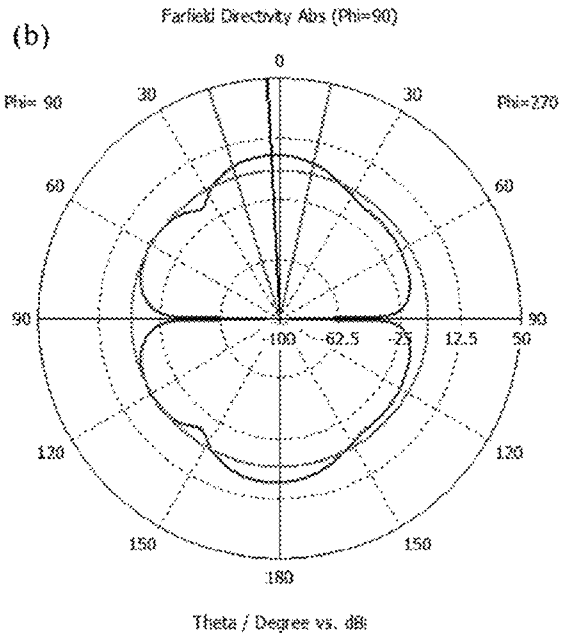
186.79 THz
FIG. 15A
FIG. 15B

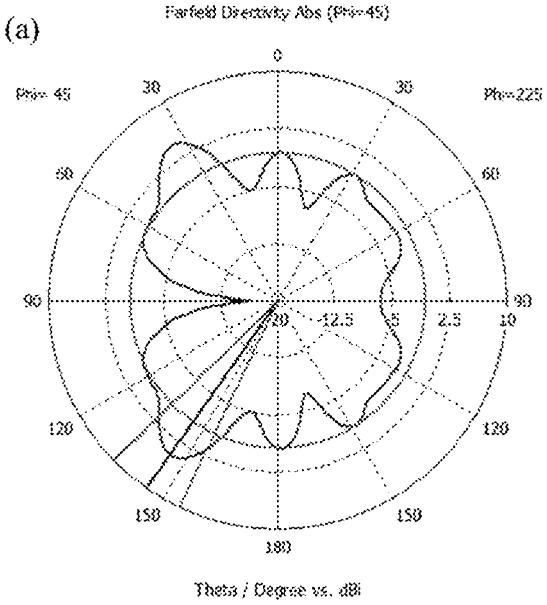
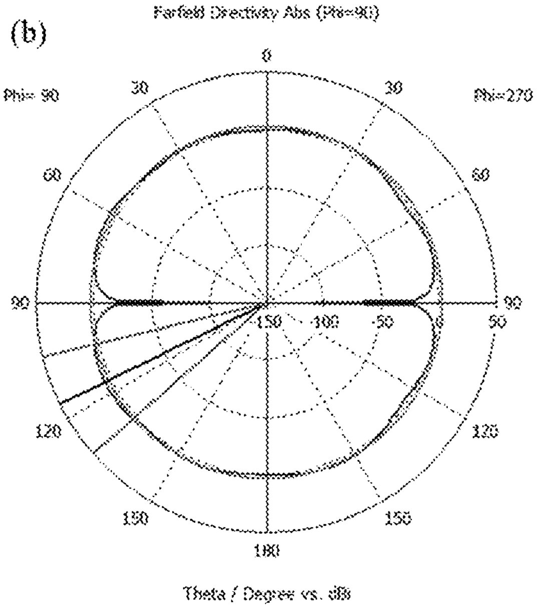
230.48 THz
FIG. 16A
FIG. 16B

DUAL-BAND OPTICAL ANTENNA FOR SUBWAVELENGTH WIRELESS NETWORKS

BACKGROUND

Wireless networks at subwavelength scale enable enhanced spatial resolution and finer control over electromagnetic interactions, thereby allowing for advanced applications in nanoscale wireless communication and sensing systems. Plasmonic antennas are pivotal components in subwavelength wireless communication systems, playing a crucial role in signal transmission and reception functionalities. In-band signals are properly processed, while out-of-band signals are effectively filtered or attenuated. To fulfill the increasingly stringent demands of THz dual-band or wide-band systems, plasmonic antenna designs are undergoing significant complexity enhancements. To increase the rigorous technical specifications of nanoplasmonic dual-band or wideband systems, antenna designs are evolving towards greater complexity.

In such systems, electromagnetic excitation may be taking place at the interface between metal-dielectric layers. This phenomenon holds the potential to manipulate light at subwavelength scales. The field components of SPPs show exponential decay from their peaks towards the surrounding media at the interfaces. Several devices have been suggested to induce oscillations of the free electron cloud in metallic structures, including V-grooves, particle arrays, and MIM (metal-insulator-metal) guiding structures. Among these, MIM slot waveguide structures are notable for their significant field confinement and minimal bending loss. As a result, a variety of subwavelength passive devices, including plasmonic pass-band and stop-band filters, resonator devices, and multi-band duplexers, have been developed using MIM slot waveguides. Fabrication of these devices often involves depositing noble metals, such as Ag or Au, onto fused dielectric substrates.

However, current conventional numerical methods have limitations in analyzing the electromagnetic behavior of subwavelength devices. Furthermore, existing antenna designs have typically emphasized single operational frequencies. Also, miniaturizing circuits for nanoscale wireless networks presents a significant challenge in balancing size reduction with maintaining desirable performance characteristics, including multi-band operation, affordability, high capability, and broad bandwidth.

BRIEF DESCRIPTION OF DRAWINGS

FIGS. 15A, 15B, 15C, and 15D are example graphical diagrams;

FIGS. 16A, 16B, 16C, and 16D are example graphical diagrams;

DETAILED DESCRIPTION OF PREFERRED EMBODIMENTS

Figure 1A:
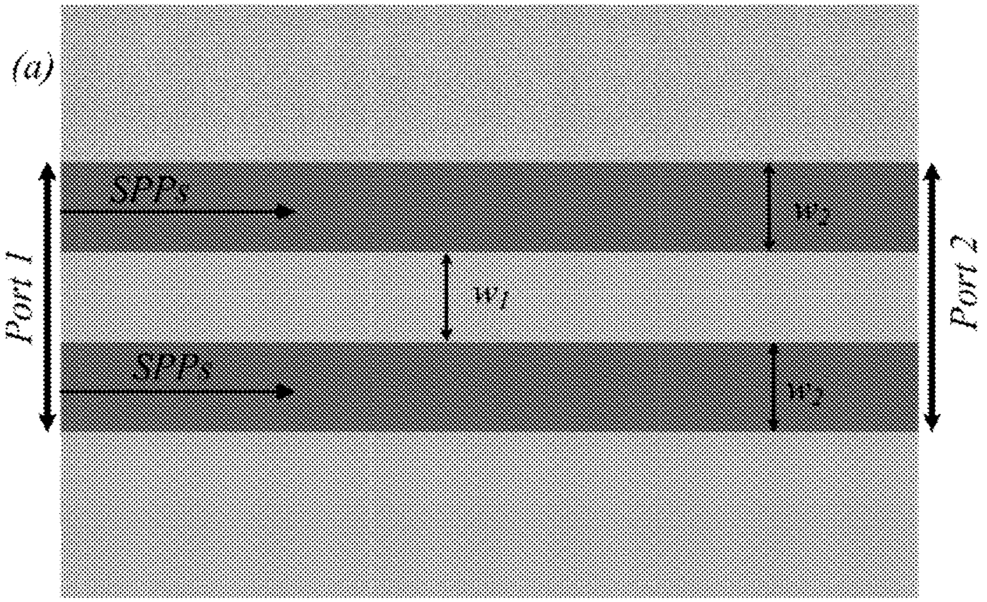
FIGS. 1A and 1B are example schematic diagrams.

The following detailed description refers to the accompanying drawings. The same reference numbers in different drawings may identify the same or similar elements.

Systems, devices, and/or methods described herein may allow for a compact, nanoplasmonic, concurrent dual-band resonators (SIRs) based band antennas on metal-insulator-metal (MIM) waveguide components. In embodiments, the systems, devices, and/or methods described herein are designed with operating frequencies to be centered around 187 THz and 230 THz. In embodiments, the proposed antennas are implemented using symmetrical coplanar waveguide (CPW) structure with insulator (silica), sandwiched between two silver metallic layers. In embodiments, the systems, devices, and/or methods incorporate the SIRs (stepped impedance resonators) enhances control over spurious resonances compared to conventional uniform impedance resonator (UIR) designs.

In embodiments, the systems, devices, and/or methods described herein provide for three concurrent dual-band optical antennas. In embodiments, the first antenna (A), is designed with two simultaneous optical center frequencies at 187 THz and 230 THz with a total length (L=3.830 μm) by using two basic SIRs. In embodiments, the second and third antennas (B), and (C), are designed at two simultaneous center frequencies at 187 THz and 230 THz with different total lengths of the antennas (L=3.820 μm) and (L=3.800 μm), respectively. Furthermore, to address the radiation null issue observed in the broadside direction of antenna (A), four parasitic slot elements are incorporated near (gap $g_1$=80 nm) the primary radiating resonators in the other two antennas, (B) and (C). Accordingly, such a modification results in omnidirectional radiation patterns at the high-order mode frequencies, thereby enhancing the performance of the antennas.

Accordingly, a plasmonic dual-band antennas allows for nanoscale wireless networks that operate on two distinct optical frequency bands designed using SIRs integrated with symmetrical MIM-CPW components leveraging surface plasmon polaritons (SPPs). Furthermore, the systems, methods, and/or devices described herein overcome previous limitations by introducing multi-band antennas operating at the nanoscale (i.e., the specific dimensions relative to the wavelength of light or the scale of nanometers). In embodiments, three dual-band antennas are designed and analyzed utilizing the concept of SIRs based on MIM waveguides. In embodiments, these systems, methods, and/or devices described herein also reduce complexity and excessive power usage.

In addition, dual-band operation occurs simultaneously at two optical frequency bands, namely the O-band and L-band.

Thus, the evaluation of three ultra-compact, nanoplasmonic concurrent dual-band antennas labeled (A), (B), and (C) is determined. These antennas operate at frequencies centered around 187 THz and 230 THz, utilizing step impedance resonators (SIRs) based on metal-insulator-metal (MIM) waveguide components. In embodiments, the proposed antennas leverage symmetrical coplanar waveguide (CPW) structures with silica as the insulator, sandwiched between silver metallic layers. Compared to conventional uniform impedance resonators (UIRs), the SIRs, described in the systems, methods, and/or devices, offer enhanced control over unwanted resonances, leading to improved performance. In embodiments, the first antenna achieved dual center frequencies of 187 THz and 230 THz with a compact total length of 3.830μ using two basic SIRs. Consequently, Antennas (B) and (C) operate at the same dual frequencies but with different total lengths: 3.820μ and 3.800μ, respectively.

To address the issue of null radiation in the broadside direction, observed in Antenna (A), four parasitic slots are added near (gap $g_1$=80 nm) the two SIRs in antennas (B) and (C). In embodiments, this adjustment resulted in achieving near-omnidirectional radiation patterns at high-order mode frequencies, significantly enhancing antenna performance. In embodiments, these multifunctional, multiband antennas, designed using MIM SIR waveguides, are characterized by their sensitivity to variations in total resonator length ($L=L_1+2L_2$). In embodiments, these antennas can be used for nanoscale wireless communication systems and offer significant potential for integration into photonic integrated circuits.

Figure 1B:
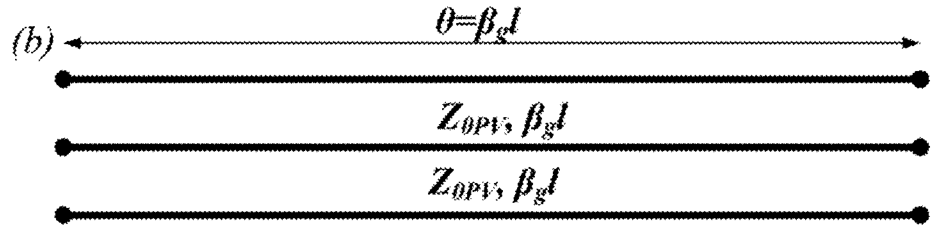
Figure 13:
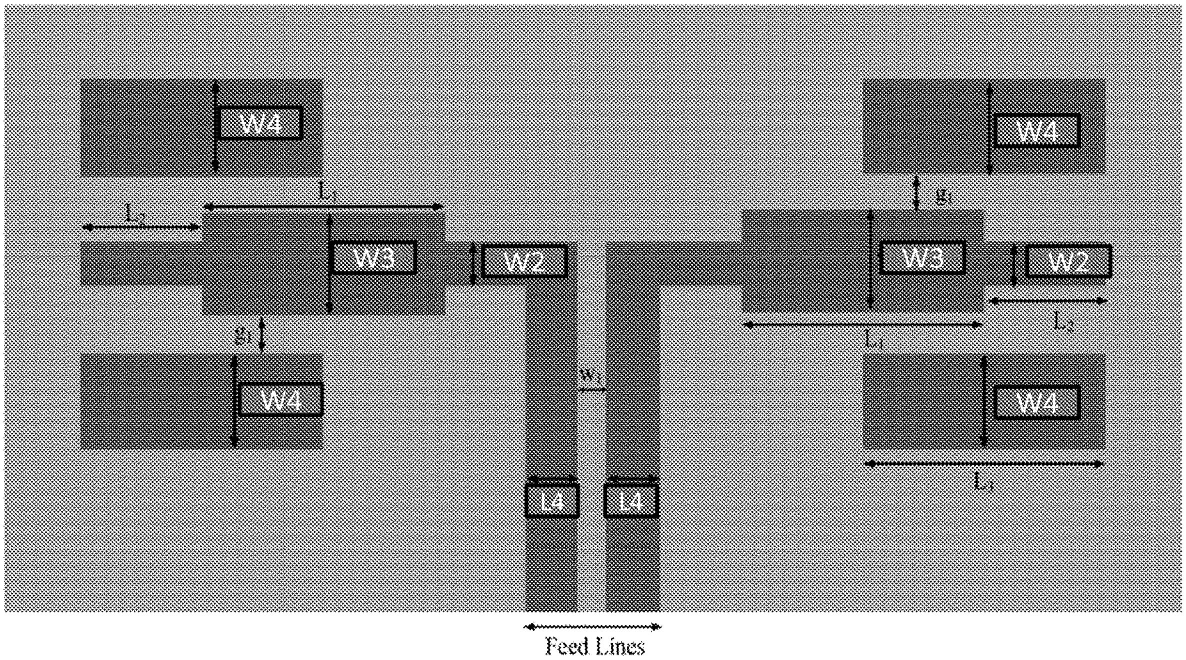
FIG. 13 is an example schematic diagram.
Figure 17:
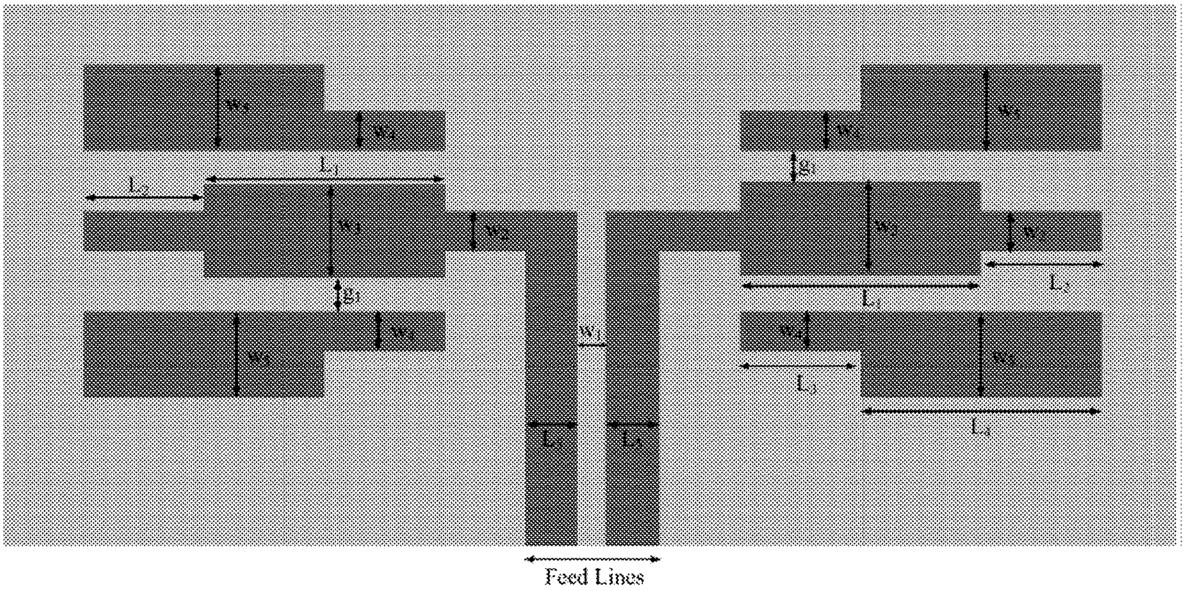
FIG. 17 is an example schematic diagram.

In embodiments, the geometry of a symmetric MIM CPW structure can be modeled using a semi-infinite three-wire transmission line with an equivalent circuit is depicted in FIGS. 1A and 1B. As shown in FIGS. 1A and 1B, this model incorporates slot widths of $w_1$=20 nm and $w_2$=60 nm, utilizing perfect matched layer (PML) boundary conditions to minimize wave reflections. In embodiments, the interaction between adjacent MIM CPWs can be investigated through numerical analysis using the conformal mapping technique (CMT) model. This effect can be achieved by incorporating two symmetric MIM CPW structures into the coupled line configuration. Utilizing this three-wire transmission Line (TL) model, the coupled plasmon oscillations in the proposed three concurrent dual-band antennas have been examined and depicted in FIGS. 9, 13, and 17. In embodiments, the dielectric constant metal (Ag) can be explained by equation (1):

$$\varepsilon_m = \varepsilon_\infty + \frac{\omega_p^2}{j\omega(\Gamma + j\omega)}$$

In embodiments, for silver (Ag), $\varepsilon_\infty$ is 3.7, ωp is $1.38\times10^{16}$ rad/s, and γ is $2.73\times10^{13}$ rad/s. Silica can be considered a dielectric material with a dielectric constant $\varepsilon_{SiO2}$) of 2.50.

In embodiments, the characteristic parameters of the three-wire transmission line (TL), such as the propagation constant ($n_{eff}$), propagation length (LSPP), and characteristic impedance ($Z_0$) of the symmetric plasmonic MIM CPW structures, have been determined using numerical analysis using the method (CMT). In embodiments, the propagation constant ($n_{eff}$) is related to the complex propagation constant γ=α+jβ. In embodiments, the propagation length ($L_{SPP}$) is defined as the distance over which the intensity decreases to 1/e of its initial value and is related to the real part of γ as $L_{SPP}=1/(2\alpha)$. In embodiments, the characteristic impedance ($Z_0$) of each symmetrical CPW can be determined for both modes of excitation as follows:

$$Z_0 = \frac{60\pi}{\sqrt{\varepsilon_{eff}}} \cdot \frac{\sqrt{w_1(w_1 + 2w_2)}}{w_2}$$

In embodiments, the coupling coefficient (Cc) between the signal lines of the symmetrical MIM CPW structure can be calculated using the following method:

$$C_C = \frac{Z_{0,even} - Z_{0,odd}}{Z_{0,even} + Z_{0,odd}}$$

where $Z_{0,\ even}$ and $Z_{0,odd}$ represent the characteristic impedances of the symmetrical MIM CPW structure for even-mode and odd-mode excitations, respectively.

Figure 2A:
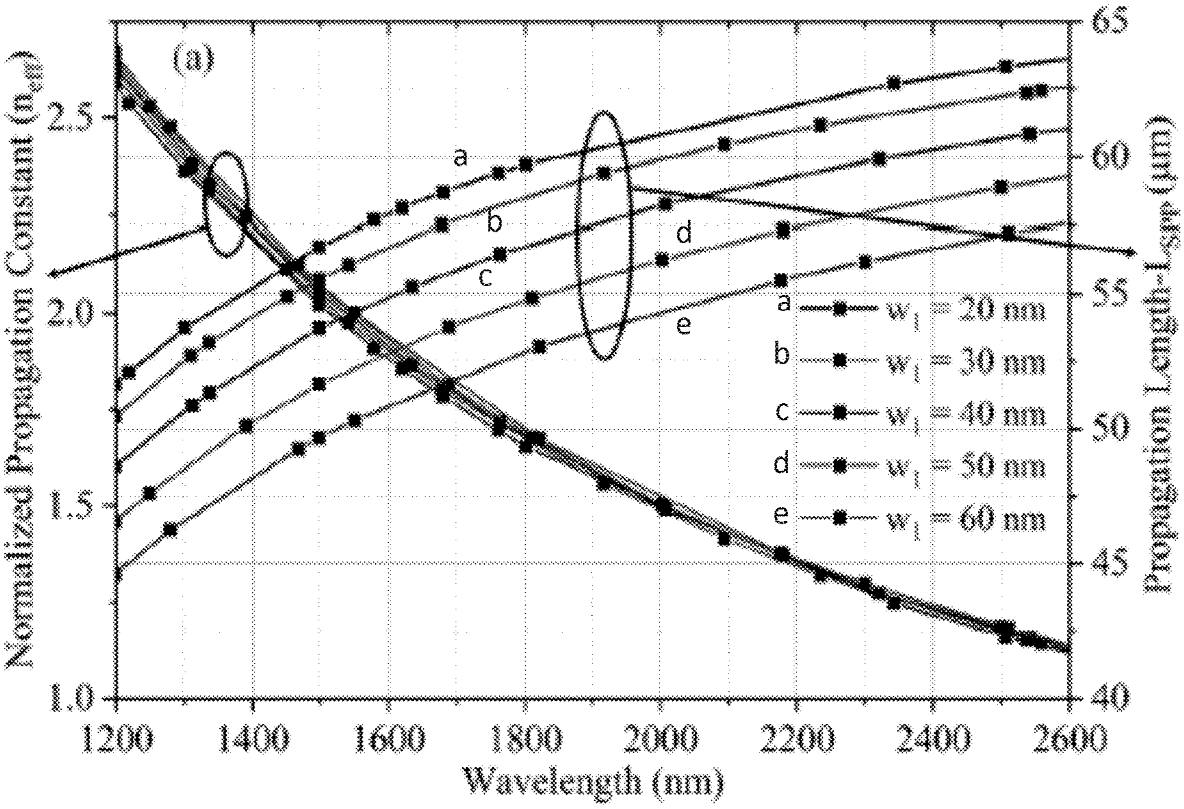
FIGS. 2A and 2B are example graphical diagrams.
Figure 2B:
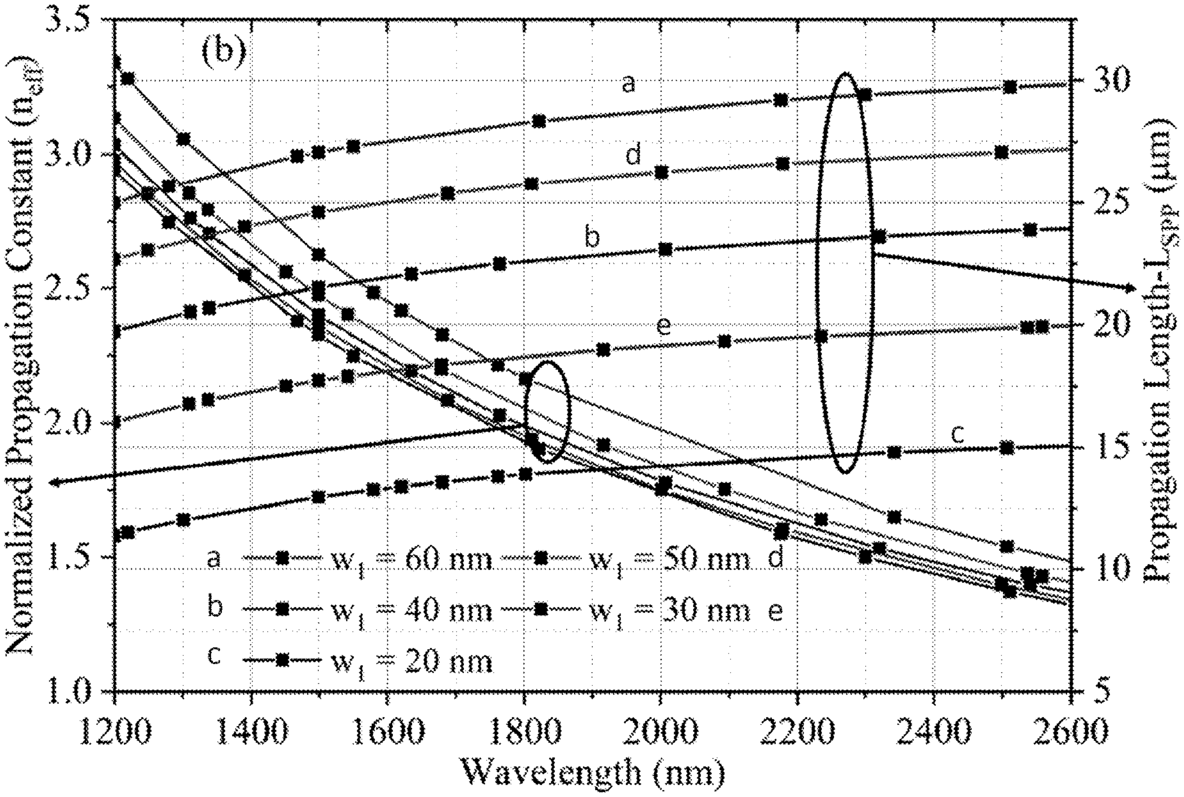
Figure 3A:
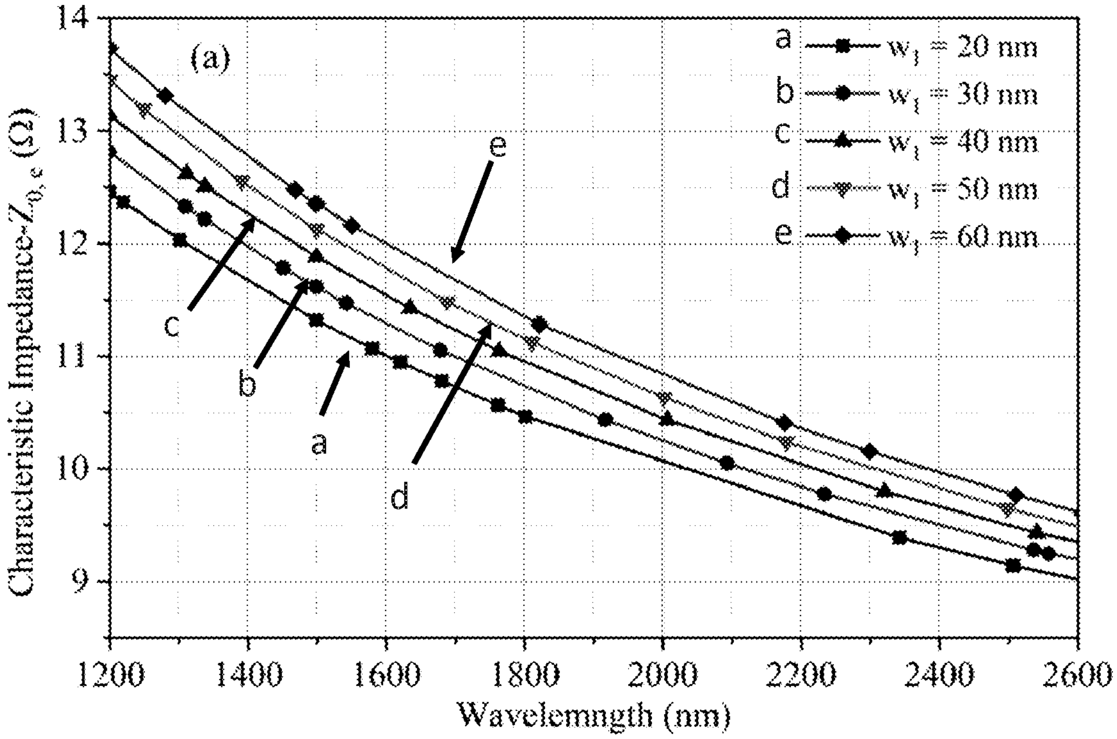
FIGS. 3A and 3B are example graphical diagrams.
Figure 3B:
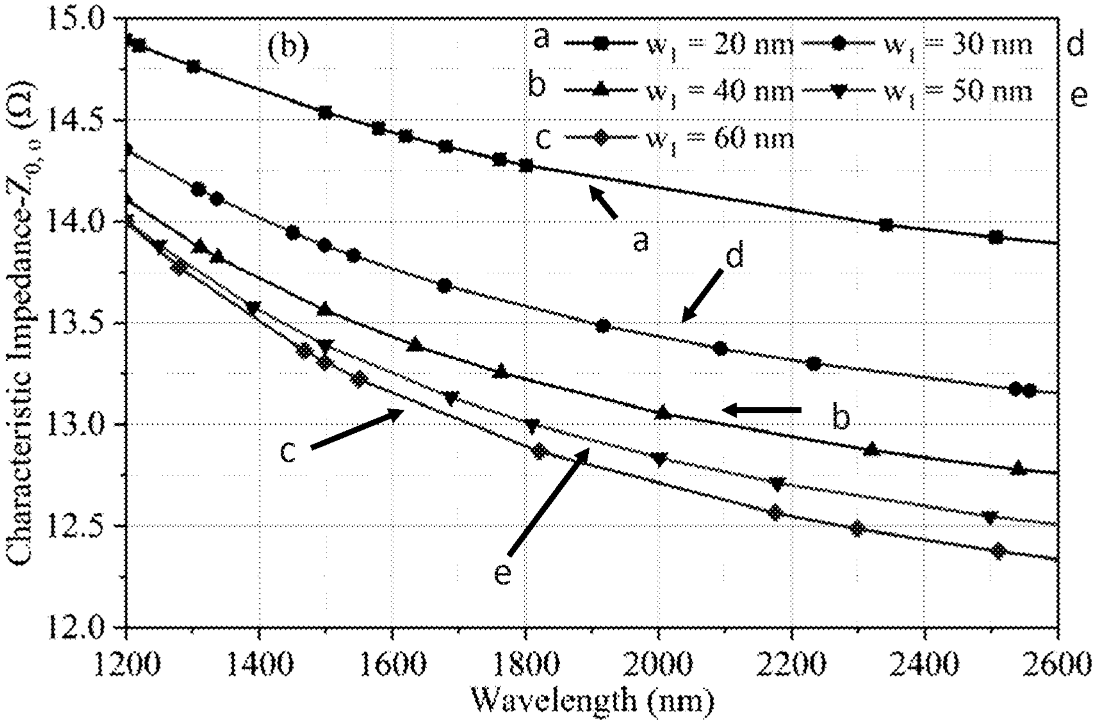

In embodiments, the effect of separation between two insulators ($w_1$) is depicted for the normalized propagation constant ($n_{eff}$), propagation length ($L_{SPP}$), characteristic impedance ($Z_0$), coupling coefficient (Cc), and electric field distribution in FIGS. 2A, 2B, 3A, 3B, 4, and 5, respectively. FIGS. 3A and 3B describe that increasing the slot width ($w_1$) has a minimal effect on the characteristic impedance ($Z_0$) for both excitations (even and odd). However, a higher impedance ratio ($Z_{0,\ even}/Z_{0,odd}$) leads to a coupling coefficient (Cc) of approximately −3 dB.

Figure 4:
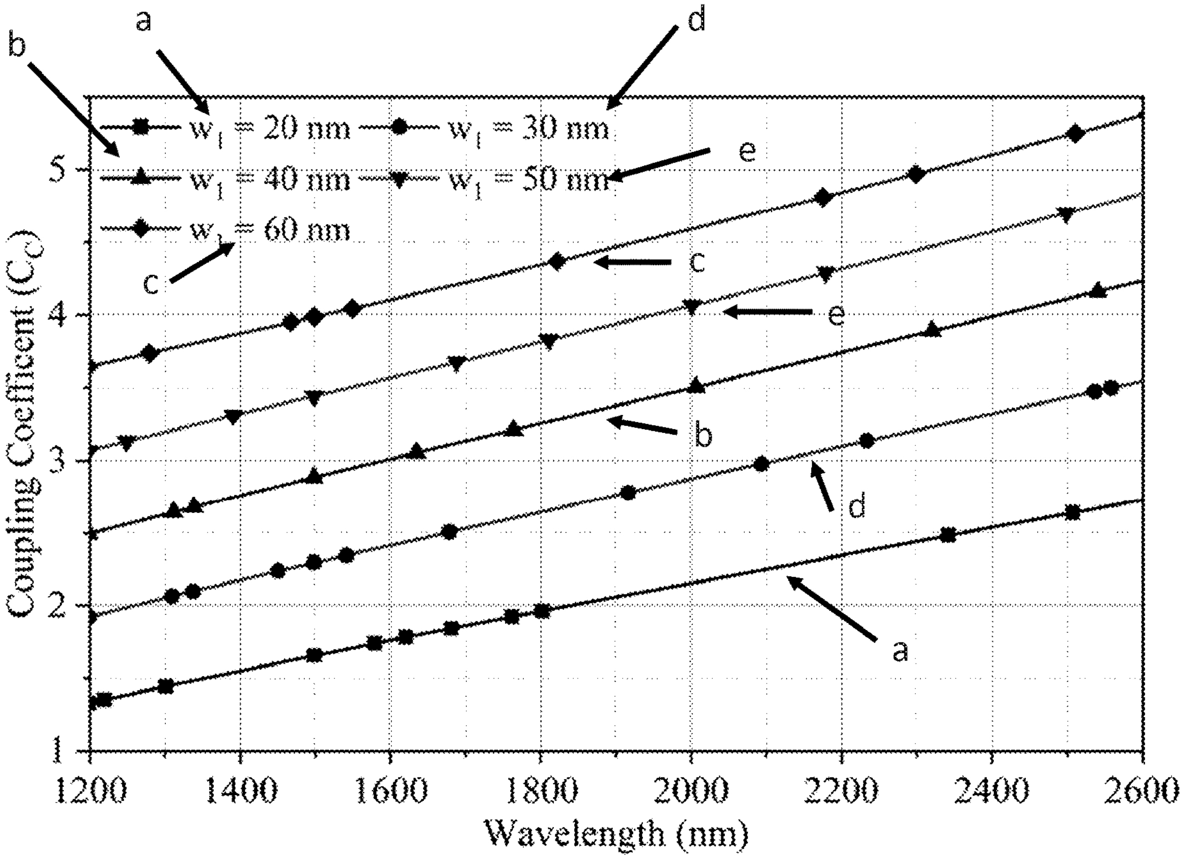
FIG. 4 is an example graphical diagram.

In embodiments, increasing the separation between the two insulators ($w_1$) has a minimal impact on the even-mode characteristic impedance ($Z_{0,\ odd}$) but a significant effect on the odd-mode impedance ($Z_{0,\ odd}$) within the MIM CPW structure, as shown in FIG. 2. In embodiments, the even-mode impedance ($Z_{0,\ odd}$) peaks at approximately 13.742Ω for a slot width of 65 nm, whereas $Z_{0,\ odd}$ can increase to around 15 (at a slot width of 135 nm. In embodiments, the normalized effective propagation constant ($n_{eff}$) exhibits a slight decrease with increasing $w_1$, while the propagation length ($L_{SPP}$) increases. These trends are shown in FIGS. 2A and 2B, respectively. In embodiments, the characteristic parameters are independent of the slot width (w), which remains constant throughout the design. As shown in FIG. 4, variations in $w_1$ can be leveraged to enhance the coupling effect of the proposed structure.

Figure 5A:
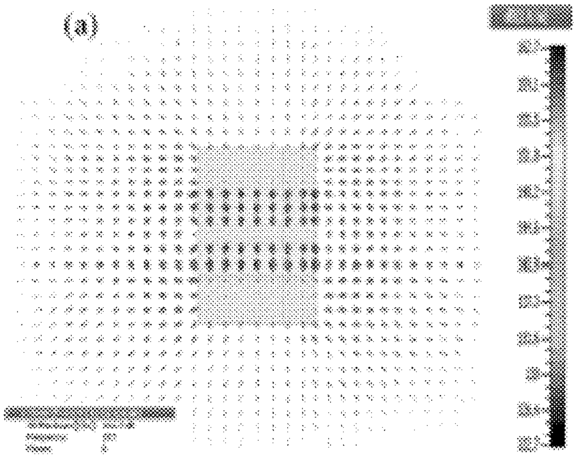
FIGS. 5A and 5B are example field distribution diagrams.
Figure 5B:
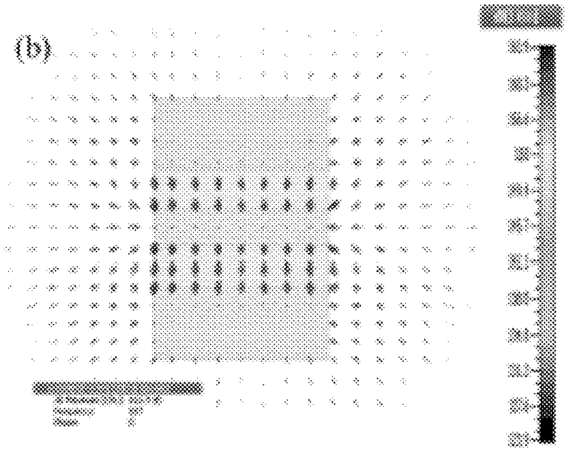
Figure 6A:
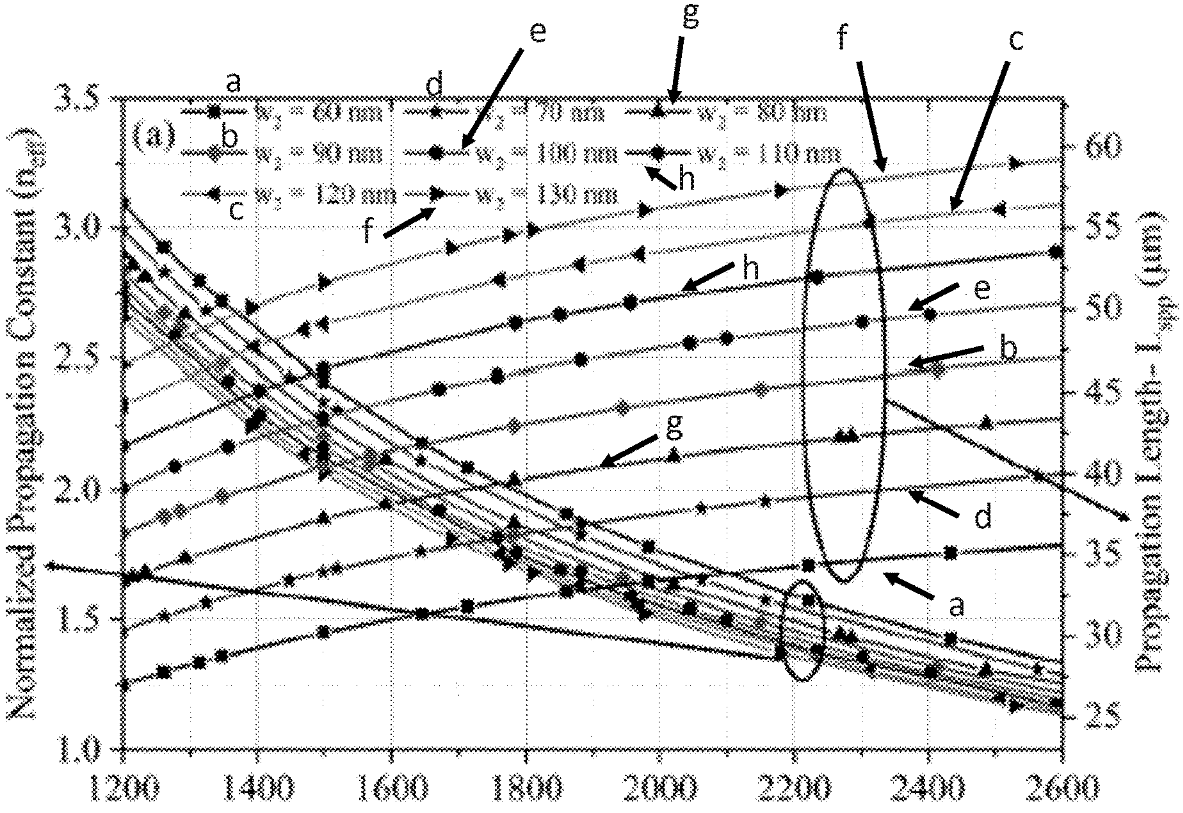
FIGS. 6A and 6B are example graphical diagrams.
Figure 6B:
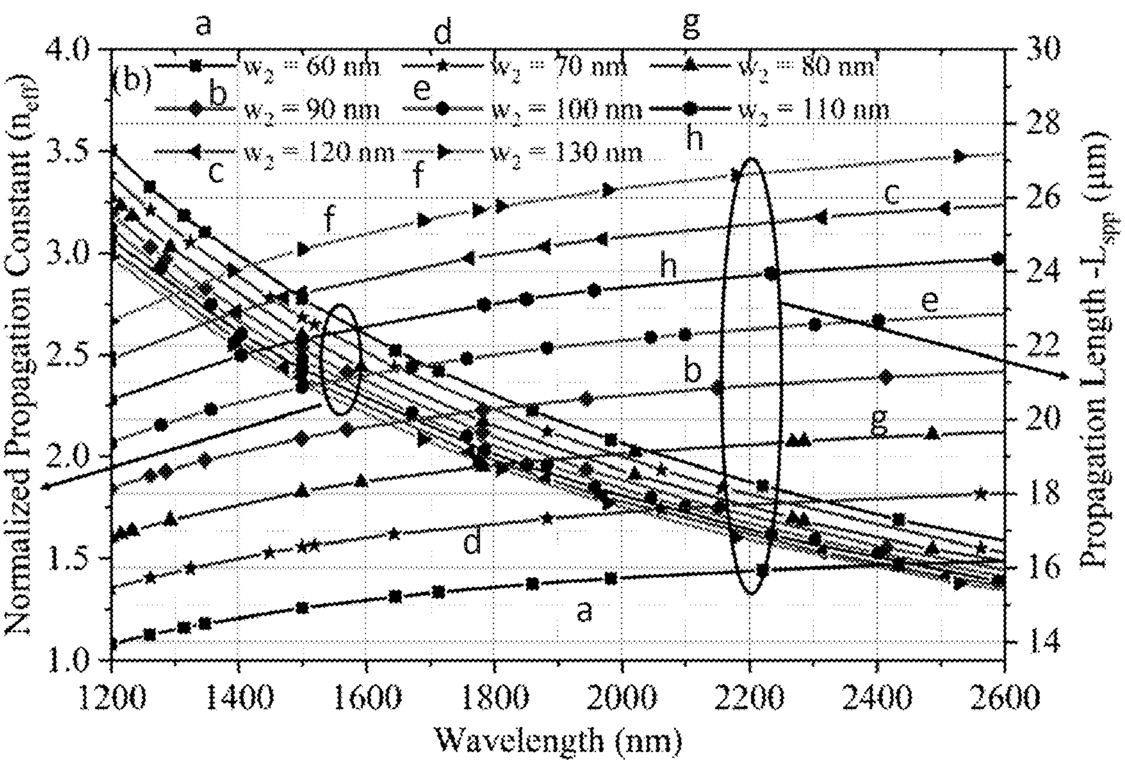
Figure 7A:
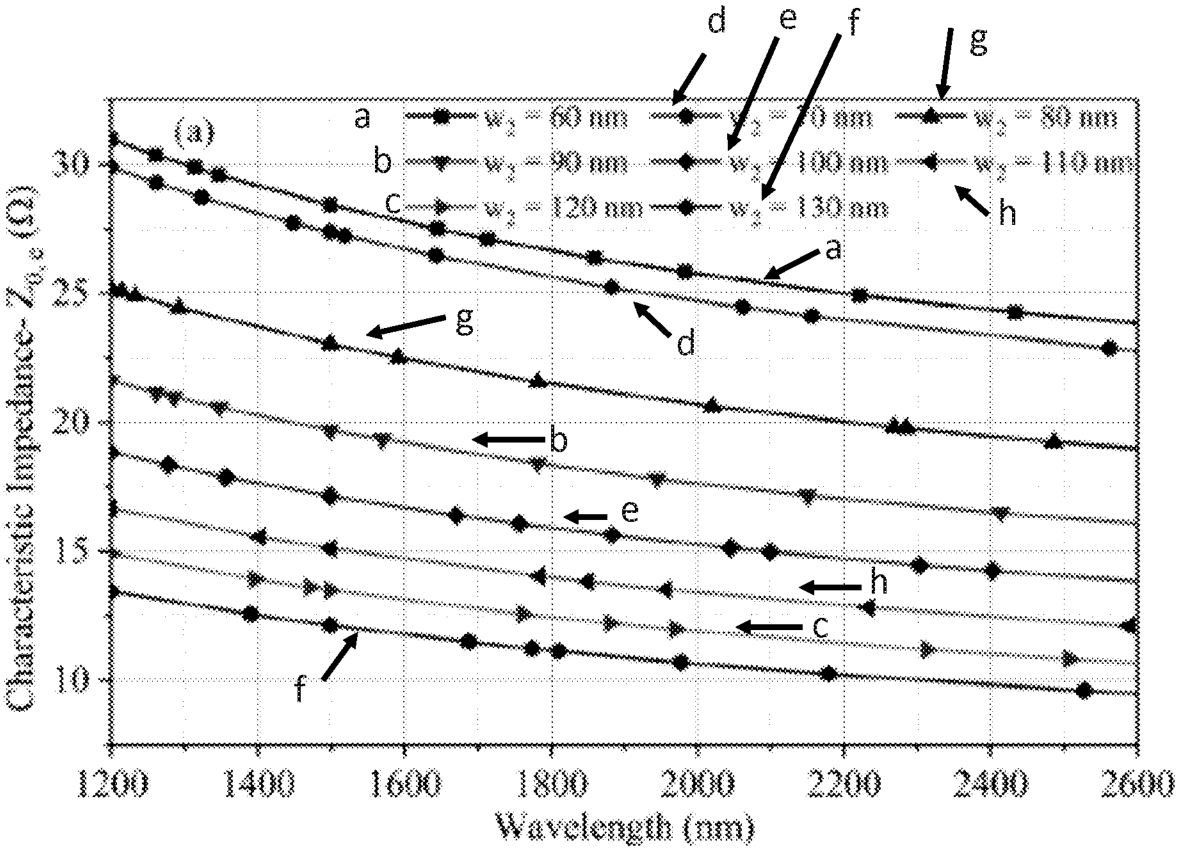
FIGS. 7A and 7B are example graphical diagrams.
Figure 7B:
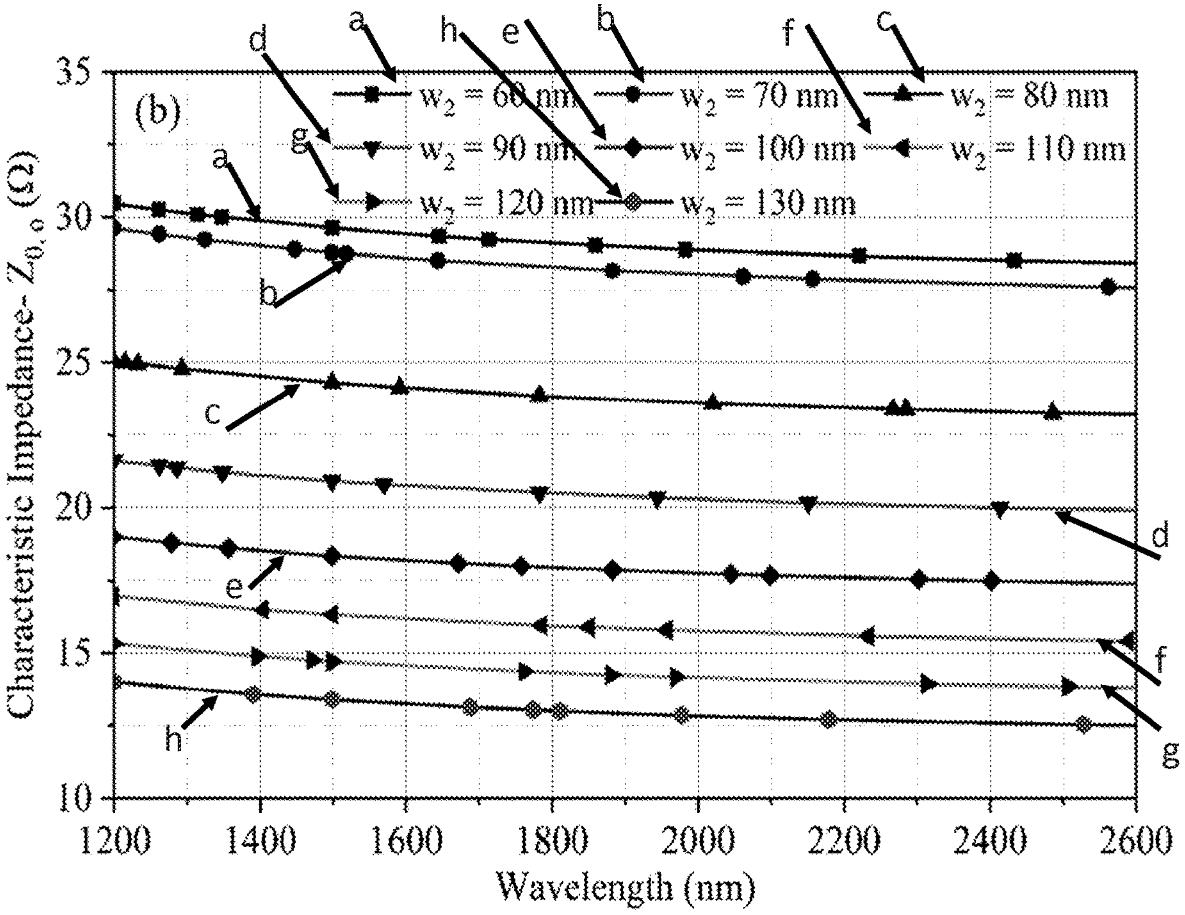
Figure 8:
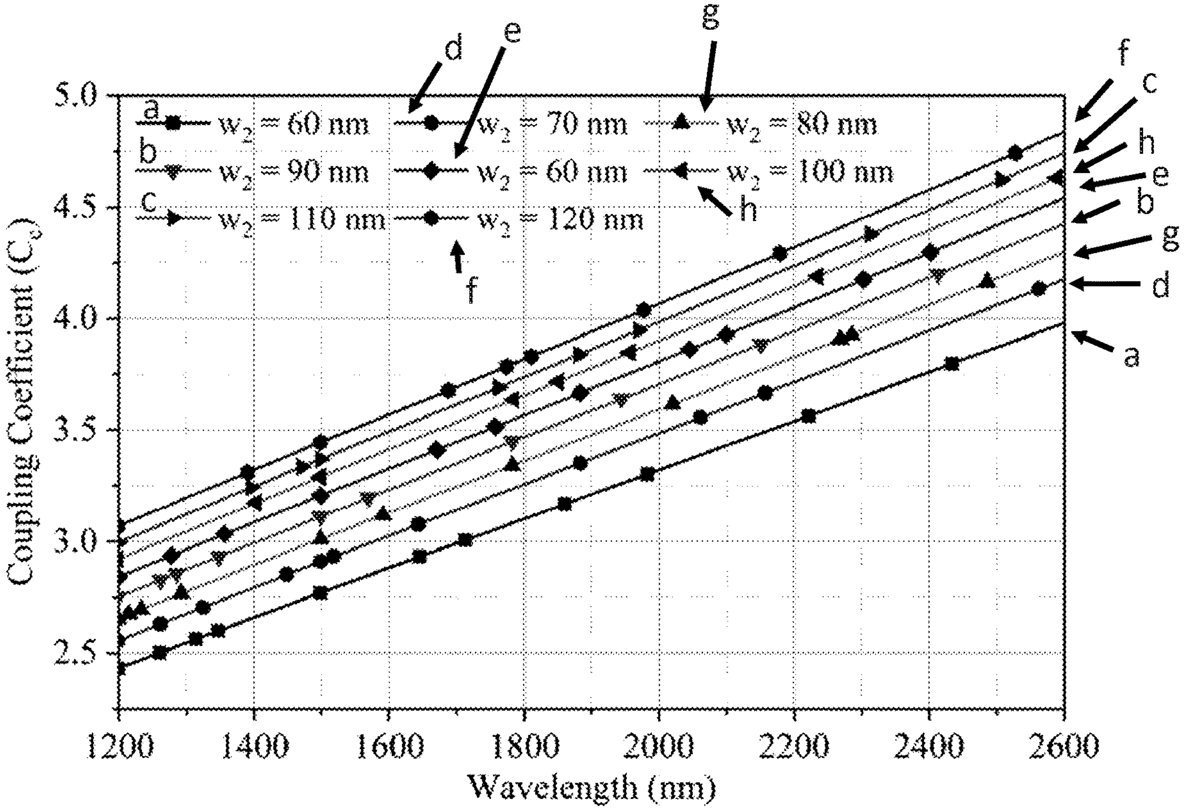
FIG. 8 is an example graphical diagram.

As shown in FIGS. 5A and 5B, the field distribution of symmetric MIM CPW (coplanar waveguide—CPW) for both fundamental modes are presented. In embodiments, these distributions, observed at a frequency of 187 THz, showcase distinct behaviors. For example, in the even mode, also known as the quasi-TEM mode, the electric field lines oscillate synchronously, maintaining phase coherence throughout the structure. Conversely, for the odd mode, a 180° phase shift is evident, indicating opposing oscillation directions at different points along the structure. In embodiments, this notable discrepancy in phase behavior between the even and odd modes is pivotal for comprehending and manipulating wave propagation characteristics within the symmetric MIM CPW structure, rendering it invaluable for diverse applications. For instance, in signal processing, the capacity to regulate the electromagnetic wave phase enables the development of sophisticated filters and multiplexers.

Furthermore, in photonics and integrated optics, harnessing this phase behavior facilitates the creation of efficient waveguides and couplers tailored for guiding and manipulating light at the nanoscale. In embodiments, the influence of symmetric slot widths ($w_2$) on various parameters such as the normalized propagation constant ($n_{eff}$), propagation length ($L_{SPP}$), characteristic impedance ($Z_0$), coupling coefficient (Cc), and electric field distribution is depicted in FIGS. 6A, 6B, 7A, 7B, 8, and 9, respectively. An increase in slot widths ($w_2$) correlates with a marginal decrease in the characteristic impedance ($Z_0$) for both modes of excitation, as depicted in FIGS. 3A and 3B. In embodiments, this tendency of marginal decrease (at least or at 5Ω for each gap width variation) leads to a higher impedance ratio ($Z_{0,\ even}/Z_{0,\ odd}$), resulting in a coupling coefficient (Cc) of −3 dB.

In embodiments, the change in symmetric slot widths ($w_2$) lead to minor fluctuations in even-mode impedance ($Z_{0,\ even}$) but bring about significant changes in odd-mode impedance ($Z_{0,\ odd}$). For example, in the MIM CPW structure depicted in FIGS. 7A and 7B, the even-mode impedance reaches a peak of approximately 31.06Ω when the slot width is 60 nm, while the odd-mode impedance can rise to about 30.511Ω at the same width. Meanwhile, the normalized effective propagation constant ($n_{eff}$) slightly decreases with increasing $w_2$, whereas the propagation length ($L_{SPP}$) grows, as demonstrated in FIGS. 6A and 6B. Notably, the separation between the two insulators ($w_1$) remains constant, leaving the characteristic parameters unaffected. The variation of $w_2$ can potentially augment the designed structure's coupling effect, as evidenced in FIG. 8.

Figure 9:
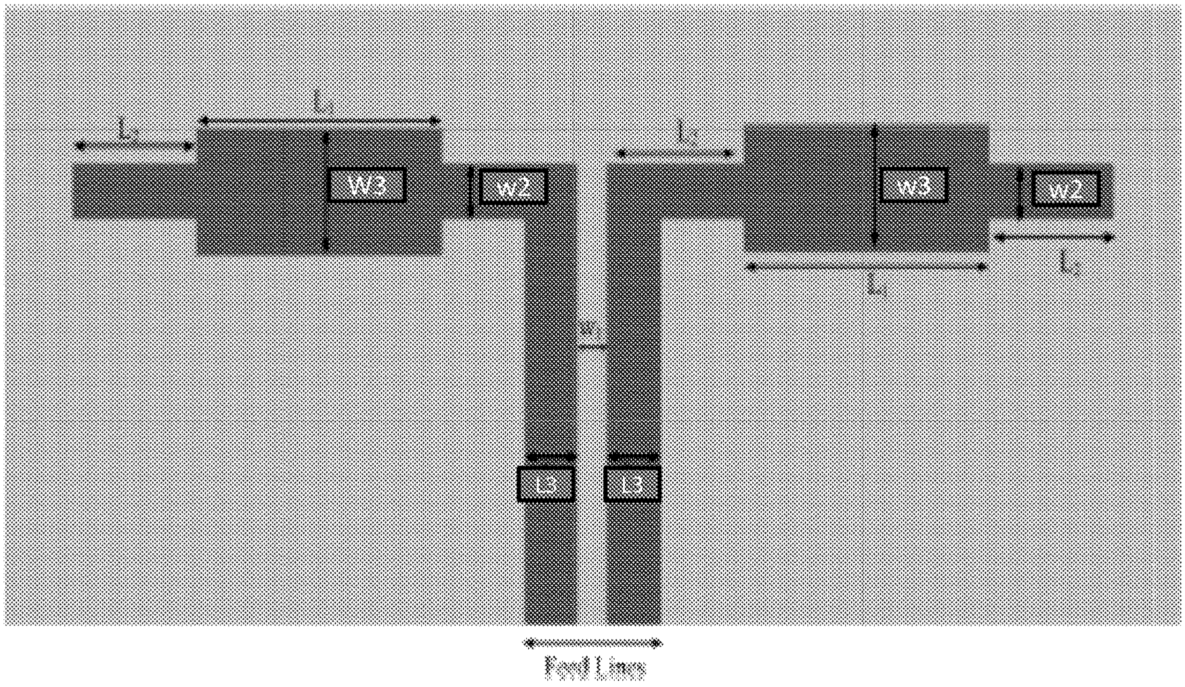
FIG. 9 is an example schematic diagram.

Furthermore, the systems, methods, and/or devices described herein for the design and analysis of three dual-band antennas: Antenna (A) is implemented using half-wavelength SIRs, Antenna (B) uses half-wavelength SIRs with parasitic slots, and Antenna (C) employs half-wavelength SIRs with extended parasitic slots. In embodiments, the schematic of the proposed dual-band antenna illustrates the configuration of a plasmonic dual-band MIM CPW-fed slot antenna comprising a 50Ω MIM CPW feeding line and a pair of half-wavelength (λg/2) slot SIRs as shown in FIG. 9. The plasmonic MIM CPW feed line enhances control over spurious frequencies, enabling the design of a dual-band antenna at a fundamental frequency ($f_0$) of 187 THz and an assigned spurious frequency ($fs_1$) of 230 THz. FIG. 9 describes the configuration of the plasmonic MIM CPW-fed slot SIRs. This specific design allows us to delve deeper into the properties of controllable spurious frequencies. By analyzing this configuration, the input impedance is derived, which plays a crucial role in understanding these frequencies by equations (4), (5), and (6):

$$Z_{input} = \frac{Z_2}{2}\left(\frac{Z^{!} + jZ_2\tan\theta_2}{Z_2 + jZ^{!}\tan\theta_2}\right) \tag{4}$$

Where $$Z^{!} = Z_1\left(\frac{Z^{!!} + jZ_1\tan 2\theta_1}{Z_1 + jZ^{!!}\tan 2\theta_1}\right) \tag{5}$$

$$Z^{!!} = jZ_2\tan\theta_2 \tag{6}$$

Where $Z_1$, $Z_2$, the characteristic impedances and $\theta_1$, $\theta_2$ are the electrical lengths. The resonance condition is represented by the impedance ratio $$K = \frac{Z_2}{Z_1} = \tan\theta_1$$

tan $\theta_2$ as expressed in equation (4).

Compared to conventional plasmonic UIR, it becomes evident that both the electrical length and the impedance ($Z_0$) influence the resonant frequencies. In embodiments, this added design flexibility enables a broader range of resonant frequency ratios, which is advantageous for multi-band or broadband antennas. The next step involves achieving impedance matching between the SIRs and the MIM CPW feedline. Upon embedding the CPW feedline in FIG. 9 (and later in FIGS. 13 and 17), the input impedance of the MIM slot dipole antenna can be obtained. It can be observed that there are numerous combinations of $Z_1$ and $Z_2$ associated with the equal impedance ratio. Hence, the impedances $Z_1$ and $Z_2$ can be adjusted to achieve impedance matching at operating frequency bands, even after establishing the particular frequency bands impedance and electrical length ratios. In embodiments, the plasmonic dual-band antennas proposed in this study are designed using plasmonic MIM waveguides, with silica as the dielectric material inserted between two metallic (Ag) layers.

In embodiments, for antenna (a), the waveguide dimensions are chosen as follows: separation between two MIM CPW fed lines ($w_1$)=23 nm, $w_2$=260 nm, $w_3$=780 nm, $L_1$=1095 nm, $L_2$=870 nm, and $L_3$=250 nm. In embodiments, the simulation results for antennas (A), (B), and (C) were conducted using grid sizes of 5 nm×5 nm along the x and y-axes, employing a simulation software tool (e.g., CST Microwave Studio Suite).

Figure 10:
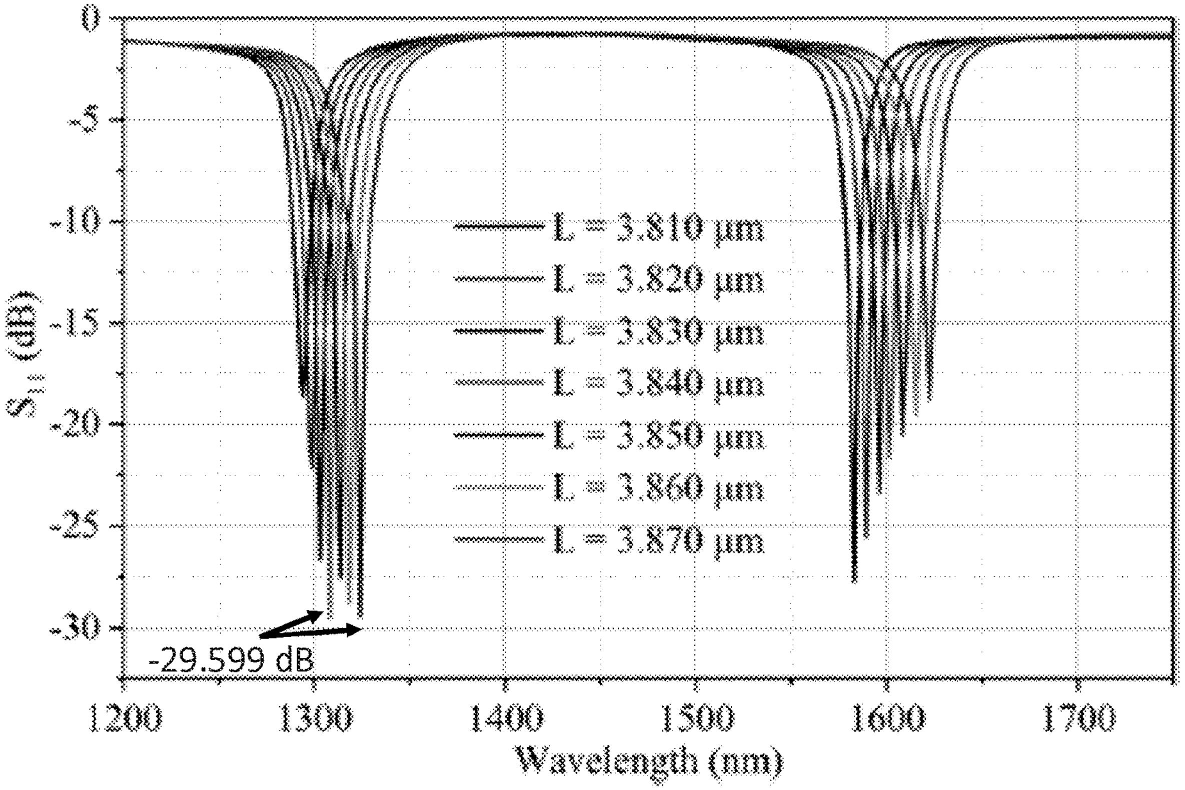
FIG. 10 is an example graphical diagram.
Figure 11A:
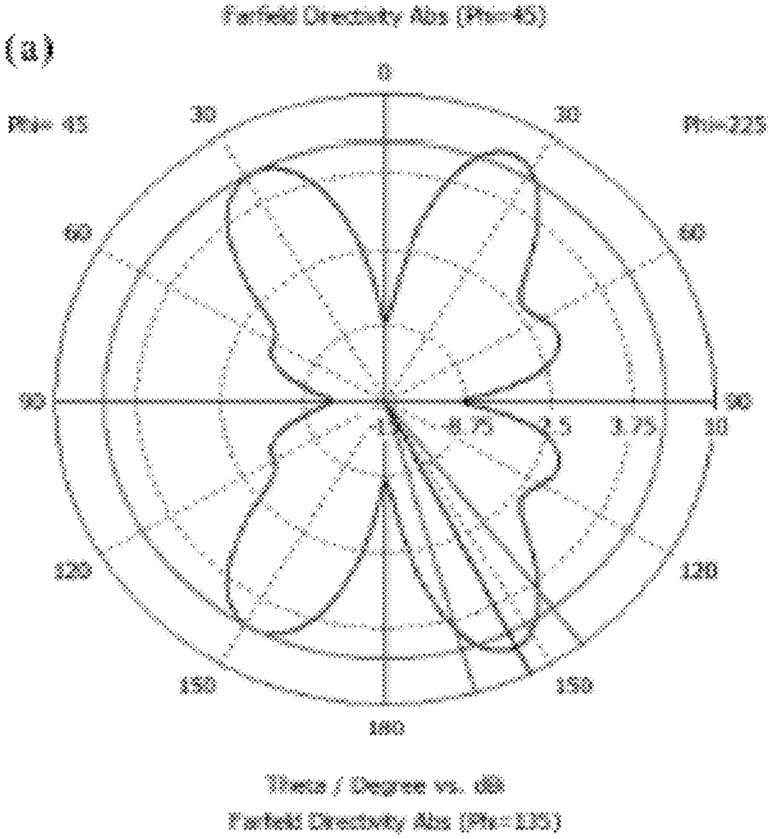
FIGS. 11A, 11B, 11C, and 11D are example graphical diagrams.
Figure 11B:
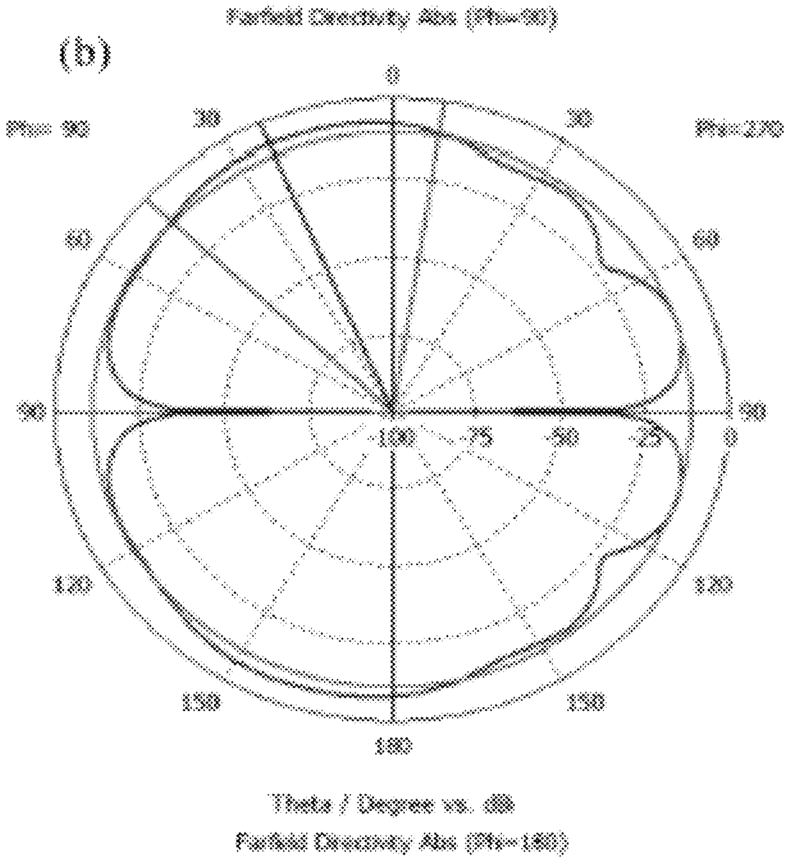
Figure 11C:
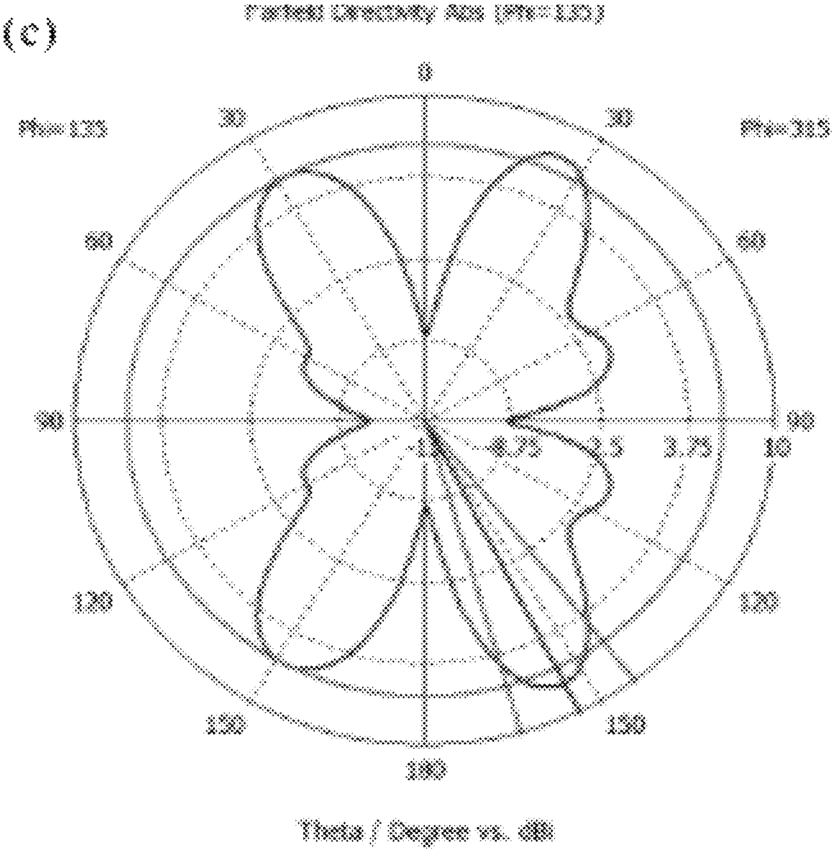
Figure 11D:
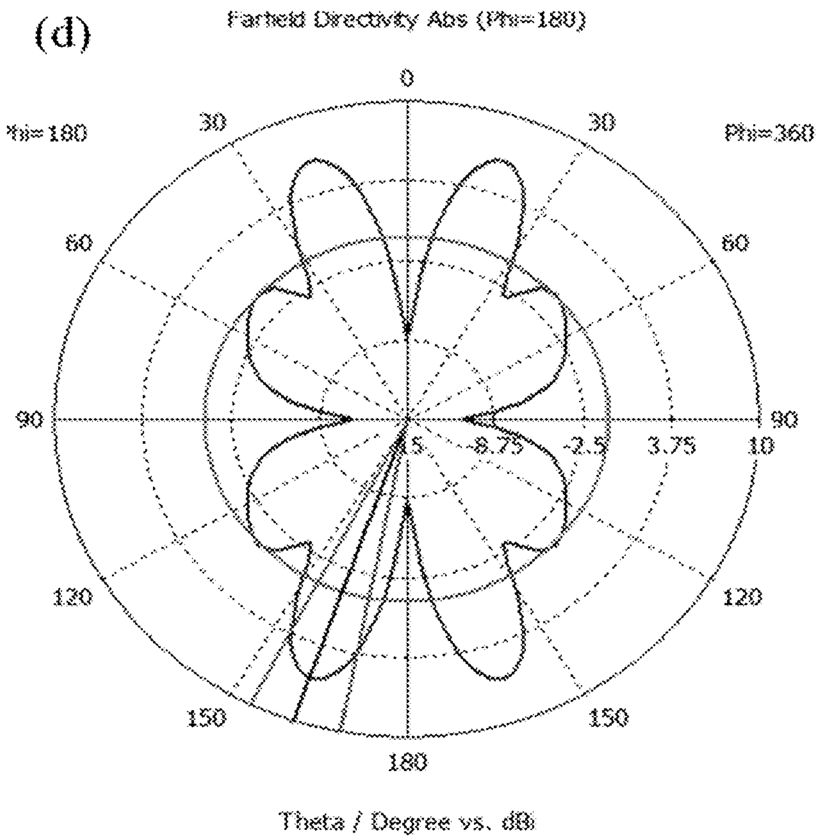
Figure 12A:
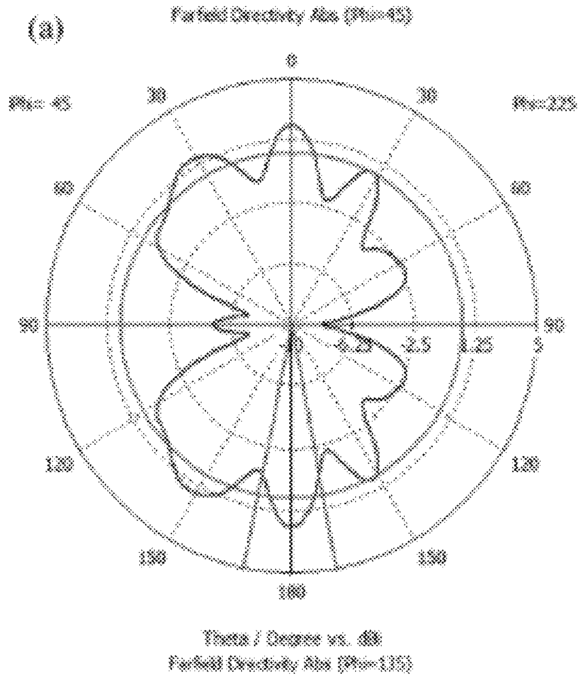
FIGS. 12A, 12B, 12C, and 12D are example graphical diagrams.
Figure 12B:
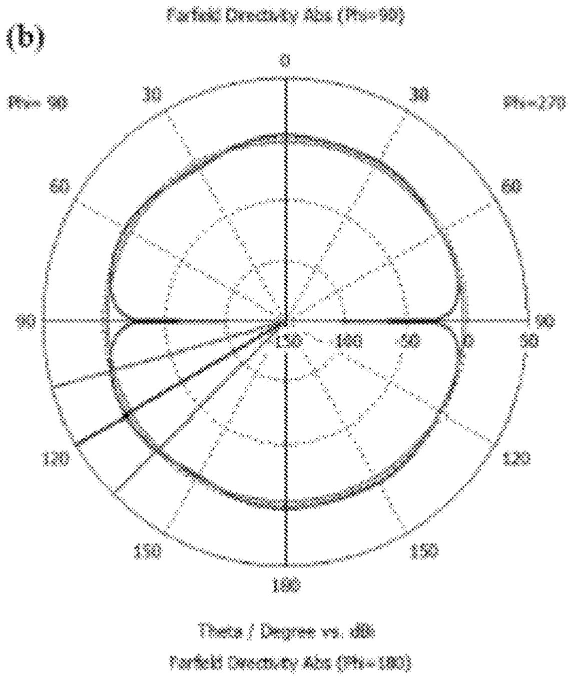
Figure 12C:
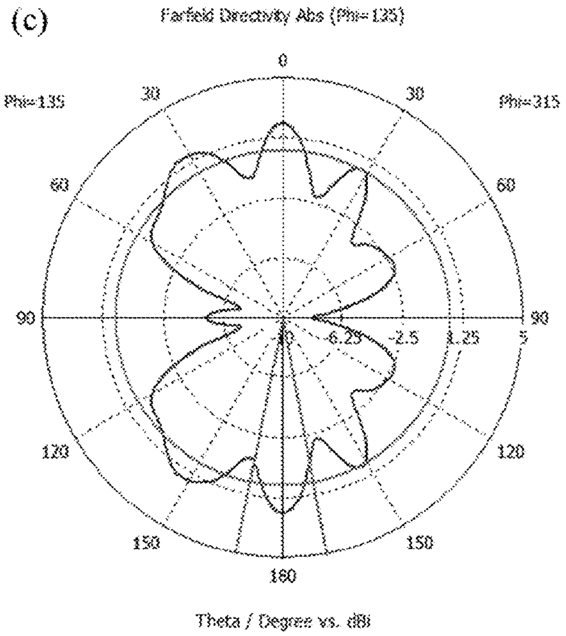
Figure 12D:
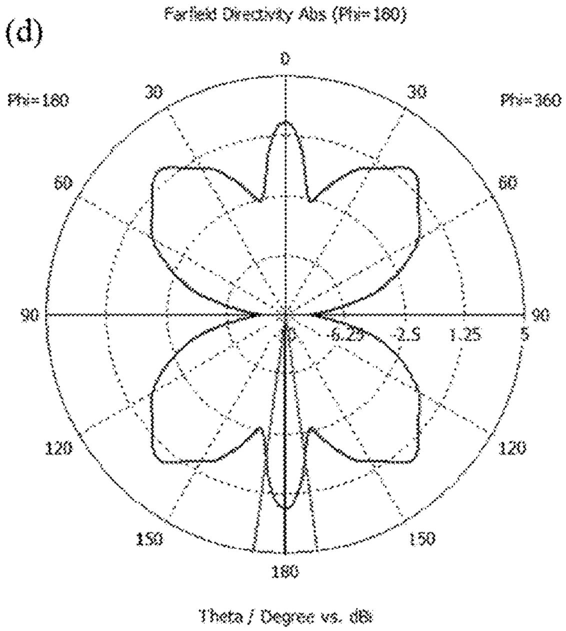

In embodiments, the proposed antenna's (A) dimensions are adjusted to achieve good sensitivity in the desired frequency bands. The reflection coefficient ($S_{11}$) of the antenna, shown in FIG. 10, indicates a return loss of −29.599 dB, signifying good signal reception. In addition, analysis reveals that the antenna's performance in these bands is particularly affected by changes in its total length ($L=L_1+2L_2$) while keeping other dimensions constant. In embodiments, L is the total length of the SIR. By tuning the total length of the resonator, the frequency bands can change their band position from 1290 nm to 1330 nm approximately, Hence, by changing the total length of the resonator (L) we can able to shift the fundamental and spurious frequencies according to optical frequency bands in between O & L bands.) FIGS. 11A-11D and 12A-12D describe the antenna's radiation pattern, confirming its dual-band operation and omnidirectional radiation characteristics. In embodiments, the proposed antenna exhibits a gain of 6.1 dBi and 7.44 dBi at the optical wavelengths of 1275 nm and 1616 nm, respectively. Accordingly, these features make the antenna well-suited for nanoscale wireless communication systems. FIGS. 11 and 12 describe an antenna's radiation pattern, confirming its dual-band operation and omnidirectional radiation characteristics. In embodiments, the proposed antenna exhibits a gain of 6.1 dBi and 7.44 dBi at the optical wavelengths of 1275 nm and 1616 nm, respectively. In embodiments, these features make the antenna well-suited for nanoscale wireless communication systems.

Figure 14:
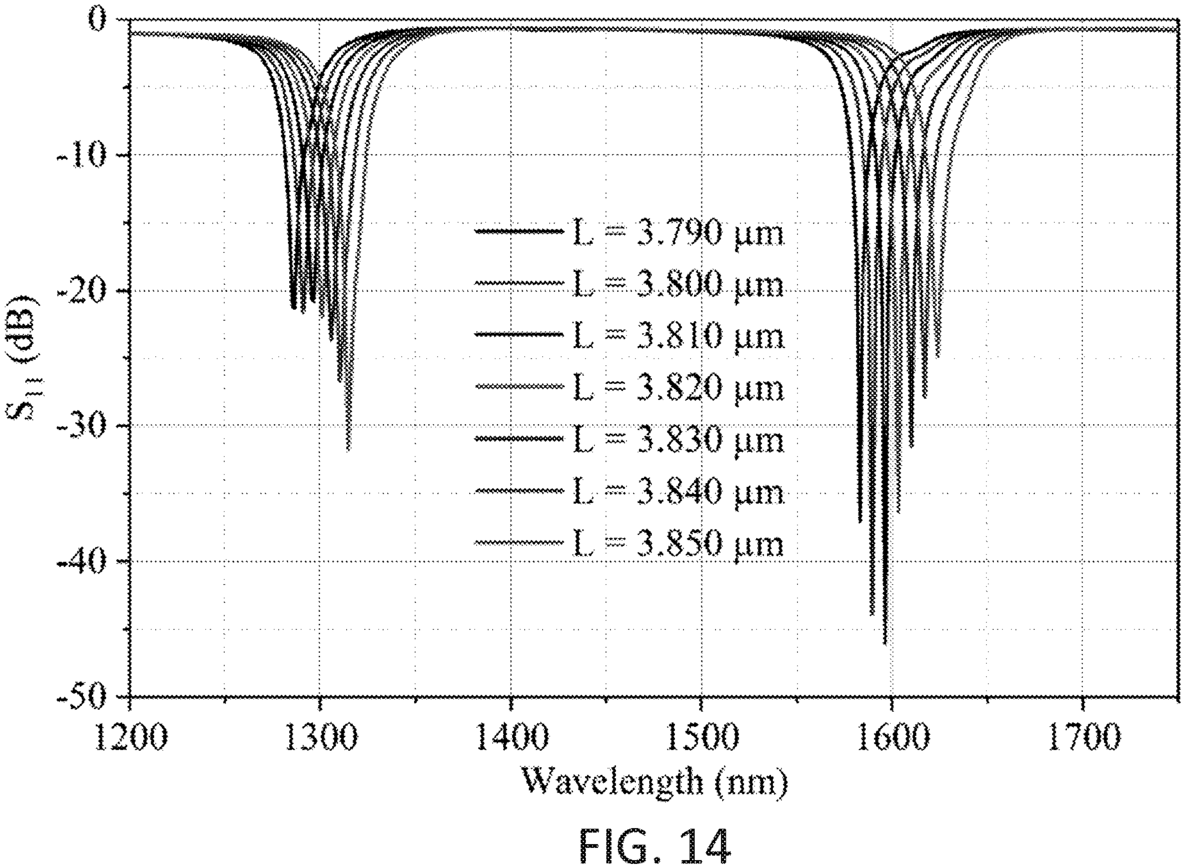
FIG. 14 is an example graphical diagram.
Figure 15C:
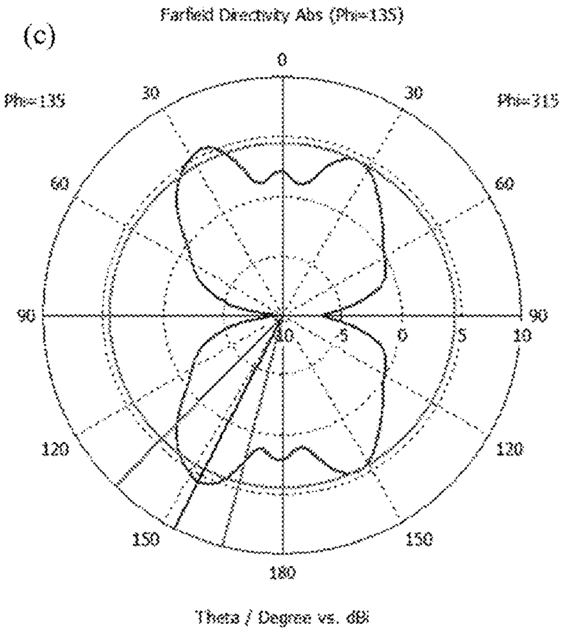
Figure 15D:
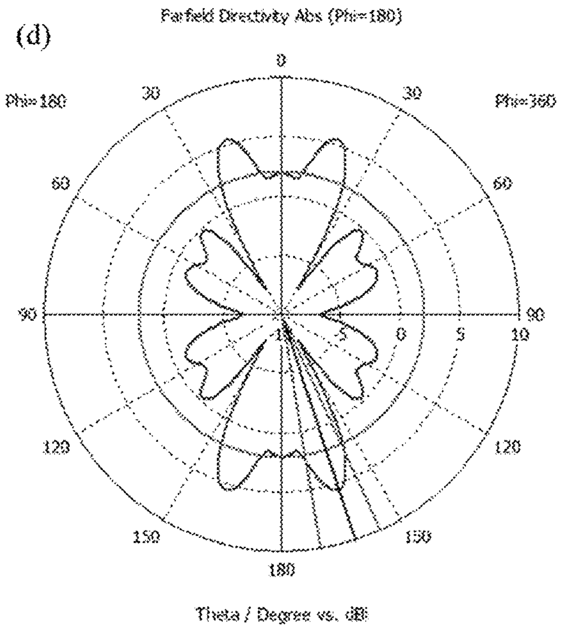
Figure 16C:
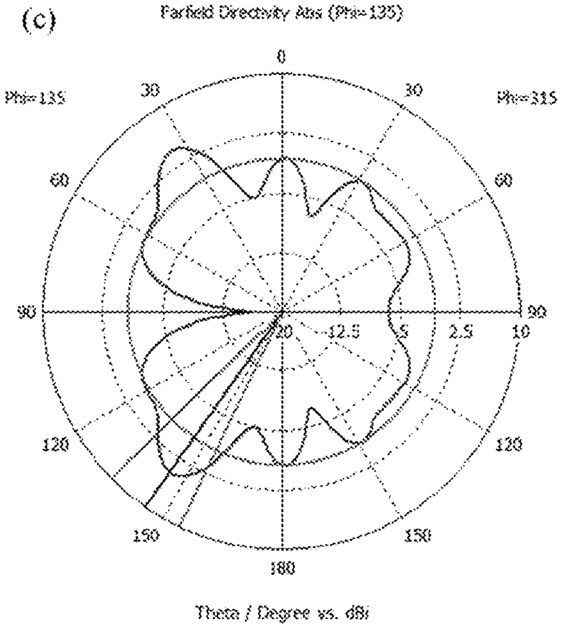
Figure 16D:
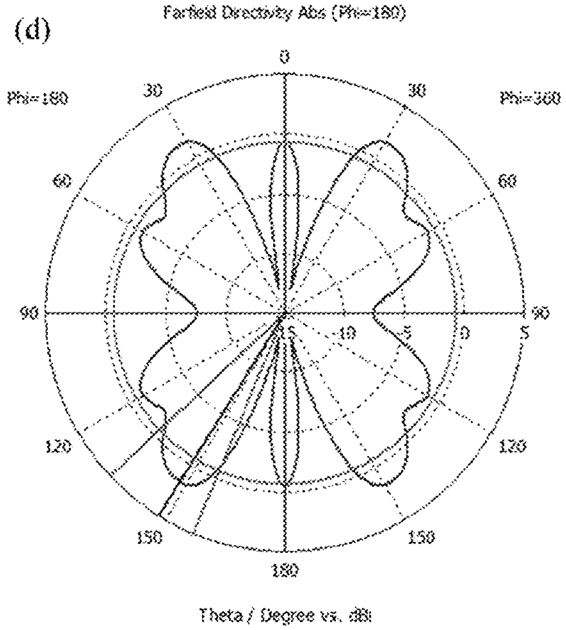

In embodiments, the physical dimensions of antenna (B) are as follows: separation between plasmonic MIM CPW-fed lines ($W_1$=30 nm, $W_2$=260 nm, $W_3$=1080 nm, $W_4$=720 nm, $L_1$=1095 nm, $L_2$=870 nm, $L_3$=1417.5 nm, $L_4$=250 nm, and gap ($g_1$)=80 nm. A parametric sweep was performed on the antenna to investigate the impact of dimensional changes on the desired operating bands. The reflection coefficient ($S_{11}$) of the proposed antenna (B), shown in FIG. 14, indicates a return loss of −46.487 dB, signifying excellent signal reception. Analysis of this parameter confirms that the antenna's performance in the desired frequency bands is particularly sensitive to variations in its total length ($L=L_1+2L_2$), while all other dimensions were held constant (parametric variation). FIGS. 15 and 16 describes the antenna's radiation pattern, verifying its dual-band operation and omnidirectional radiation characteristics. These features, crucial for nanoscale wireless communication systems, ensure the antenna transmits and receives signals effectively in all directions. Additionally, the antenna exhibits a gain of 6.18 dBi and 6.12 dBi at the wavelengths of 1300.73 nm and 1604 nm, respectively.

The systems, methods, and/or devices described herein, describe a plasmonic dual-band antenna featuring a structure similar to the proposed antenna but with extended parasitic slots. In embodiments, the dimensions of dual-band antenna (C) are as follows: separation between plasmonic MIM CPW-fed lines ($w_1$)=30 nm, $w_2$=260 nm, $w_3$=1080 nm, $w_4$=200 nm, $w_5$=460 nm, $L_1$=1085 nm, $L_2$=865 nm, $L_3$=542.5 nm, $L_4$=1407.5 nm, and gap ($g_1$)=90 nm. A parametric sweep was performed on the antenna design to investigate the impact of dimensional changes on the desired operating bands.

Figure 18:
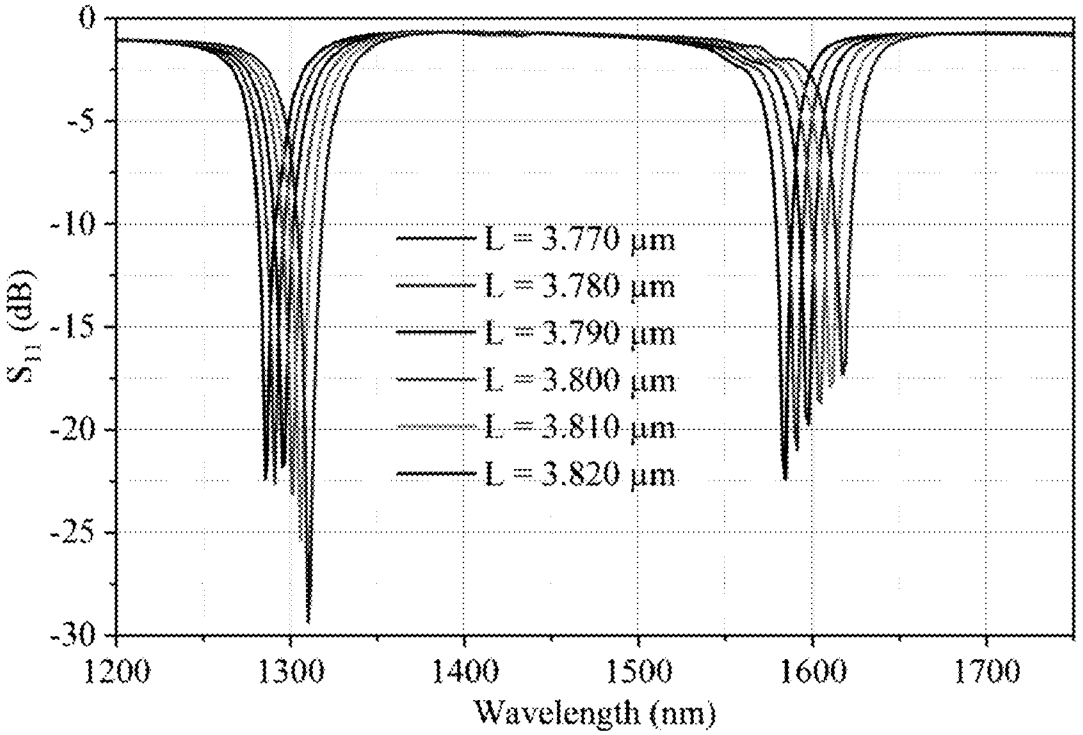
FIG. 18 is an example graphical diagram.
Figure 19A:
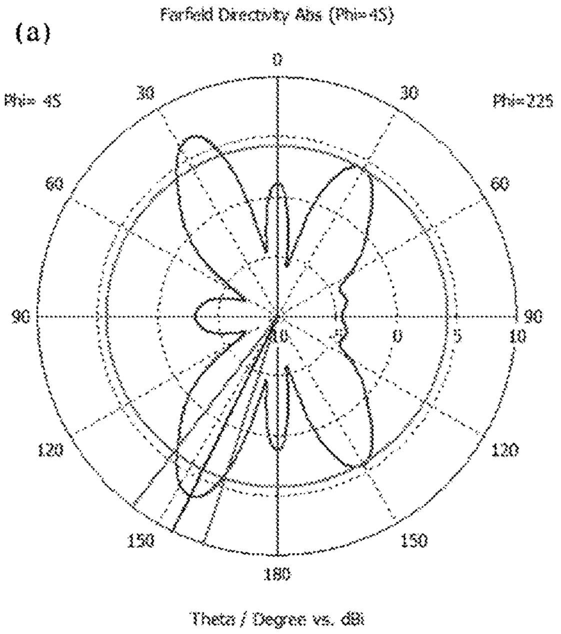
FIGS. 19A, 19B, 19C, and 19D are example graphical diagrams.
Figure 19B:
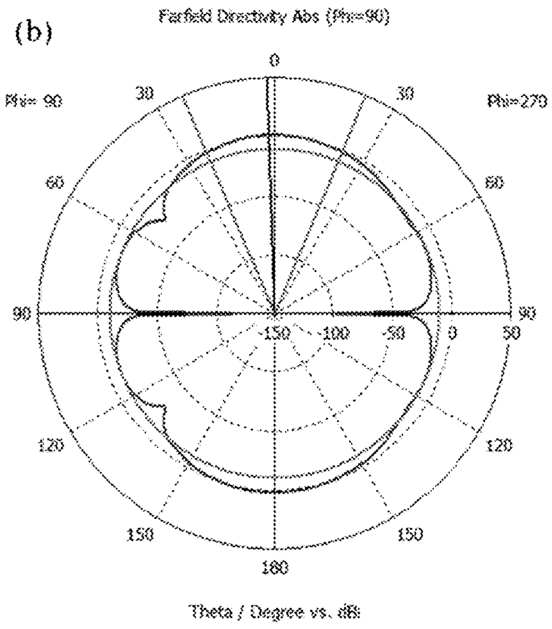
Figure 19C:
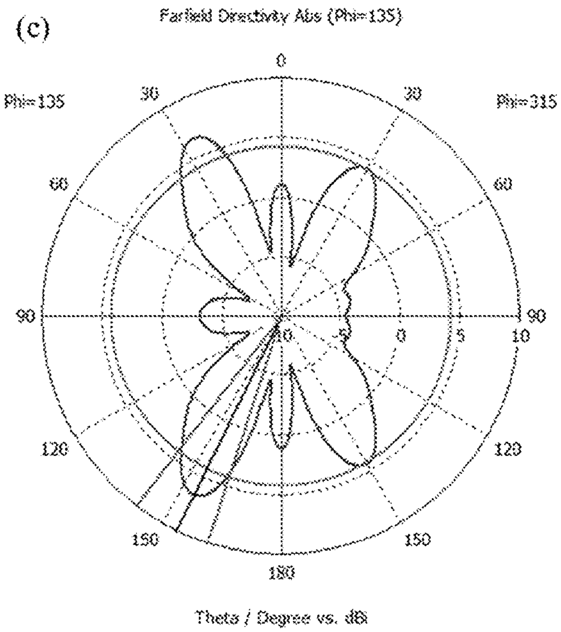
Figure 19D:
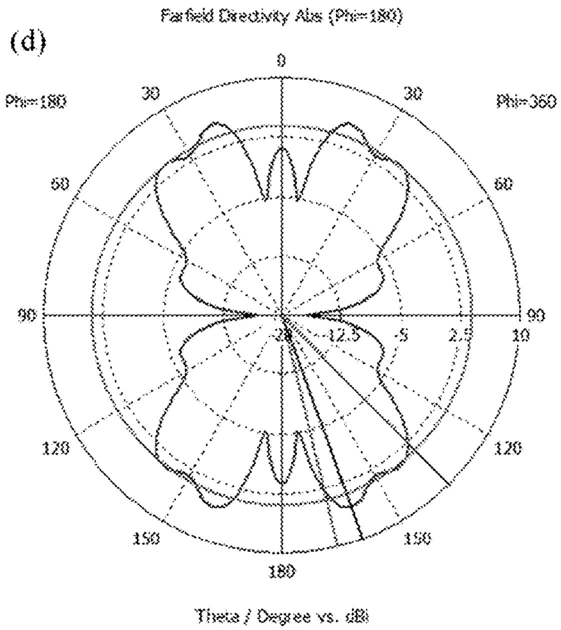
Figure 20A:
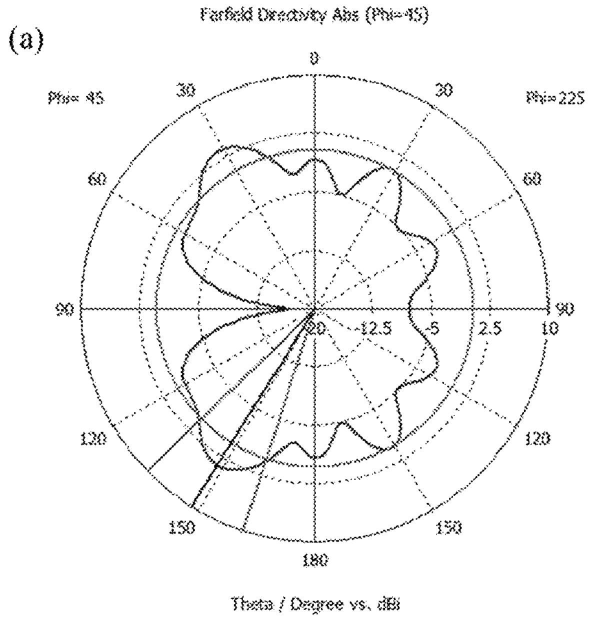
FIGS. 20A, 20B, 20C, and 20D are example graphical diagrams.
Figure 20B:
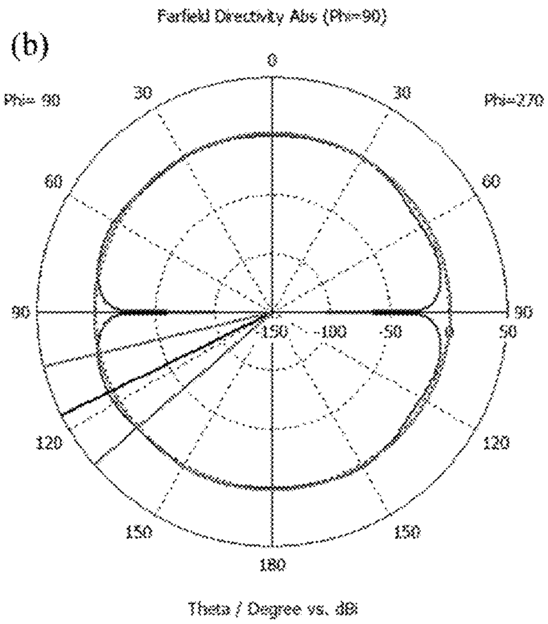
Figure 20C:
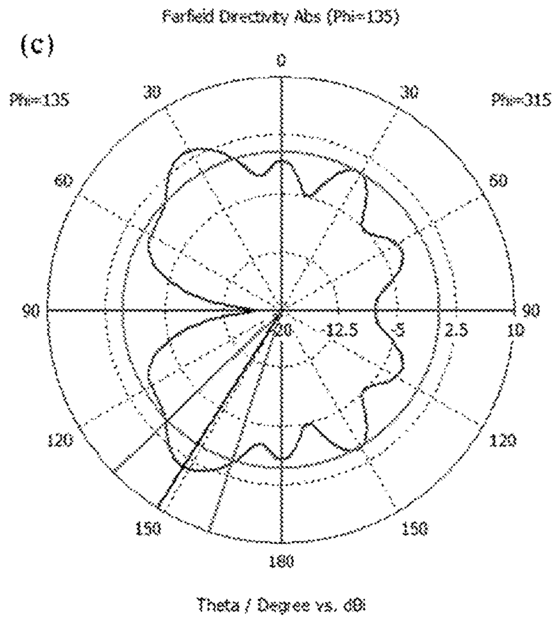
Figure 20D:
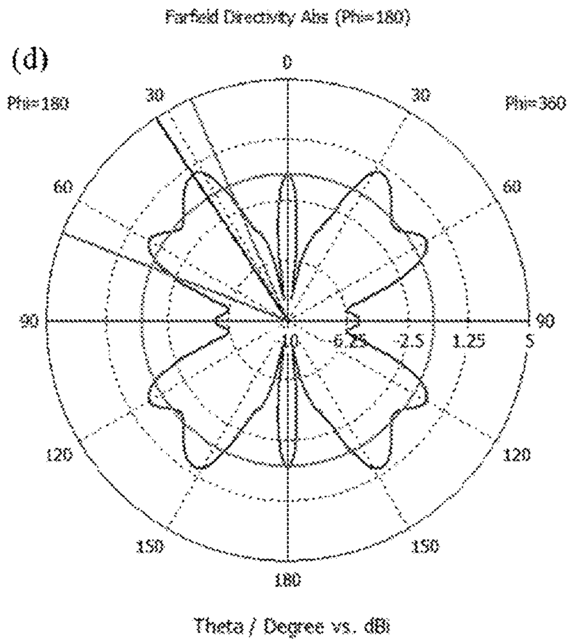

In embodiments, the reflection coefficient ($S_{11}$) of the proposed antenna (C), shown in FIG. 18, indicates a return loss of −29.445 dB, signifying good signal reception. Analysis of this parameter reveals that the antenna's performance in the desired frequency bands is particularly sensitive to variations in its total resonator length ($L=L_1+2L_2$), while all other dimensions were kept constant (parametric variation). FIGS. 19A-19D and FIGS. 20A-20D describes the antenna's radiation pattern, confirming its dual-band operation and omnidirectional radiation characteristics. These features, essential for nanoscale wireless communication systems, ensure the antenna effectively transmits and receives signals in all directions. Additionally, the antenna exhibits a gain of 5.98 dBi and 6.75 dBi at the wavelengths of 1296.11 nm and 1597 nm, respectively.

Figure 21:
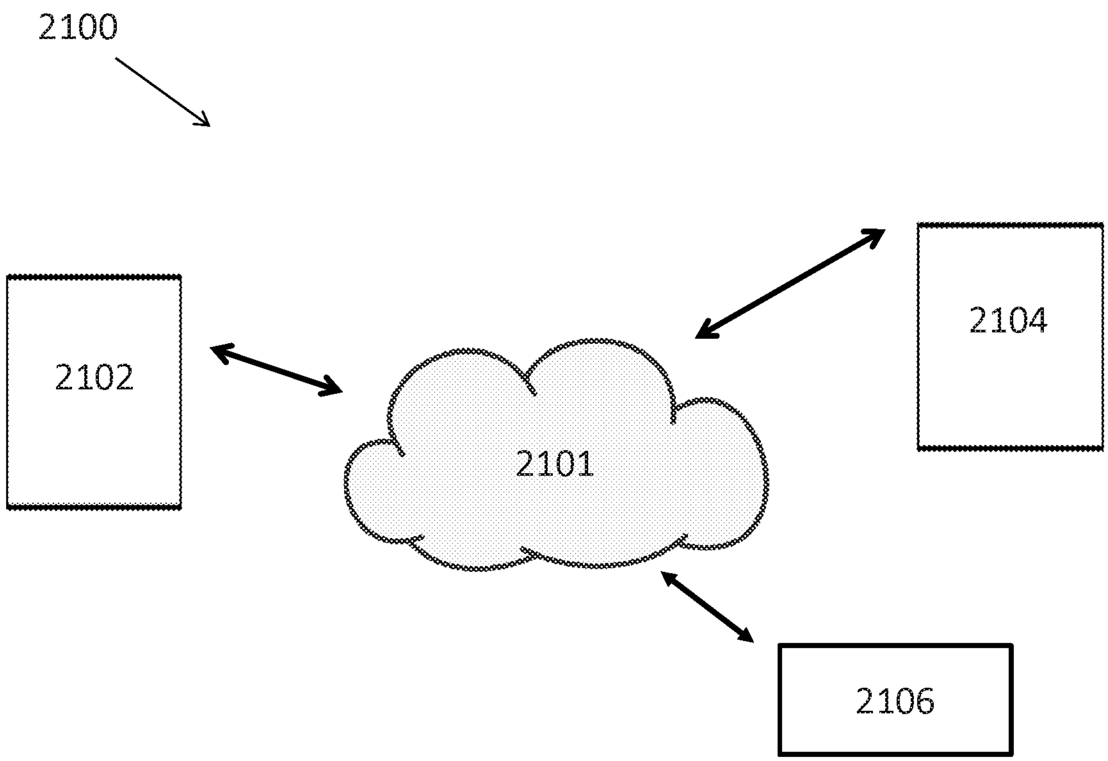
FIG. 21 is a diagram of a network environment.

FIG. 21 is a diagram of example environment 2100 in which systems, devices, and/or methods described herein may be implemented. FIG. 21 shows network 2101, user device 2202, user device 2204, and antenna 2206.

Network 2101 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 2200 may include a cellular network, a public land mobile network (PLMN), a second generation (2G) network, a third generation (3G) network, a fourth generation (4G) network, a fifth generation (5G) network, and/or another network.

In embodiments, network 2101 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 2202 and/or 2204 may include any computation or communications device that is capable of communicating with a network (e.g., network 2101). For example, user device 2202 and/or user device 2204 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 2102 and/or 2104 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 2102 and/or 2104. User device 2102 and/or 2104 may have a touch screen and/or a keyboard that allows a user to electronically interact with an electronic application. In embodiments, a user may swipe, press, or touch user device 2102 and/or 2104 in such a manner that one or more electronic actions will be initiated by user device 2102 and/or 2104 via an electronic application. User device 2102 and/or 2104 may receive electronic information from antenna 2106 and generate and display graphs such as those described in the figures above.

User device 2102 and/or 2104 may include a variety of applications, such as, for example, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Antenna 2106 may include one or more computational or communication devices that gather, process, store, and/or provide for the transmittal of wireless communications. In embodiments, antenna 2106 may be a nanoplasmonic, concurrent dual-band resonators (SIRs) based band antennas on metal-insulator-metal (MIM) waveguide components that is based on the features described in this description and in the above figures.

Figure 22:
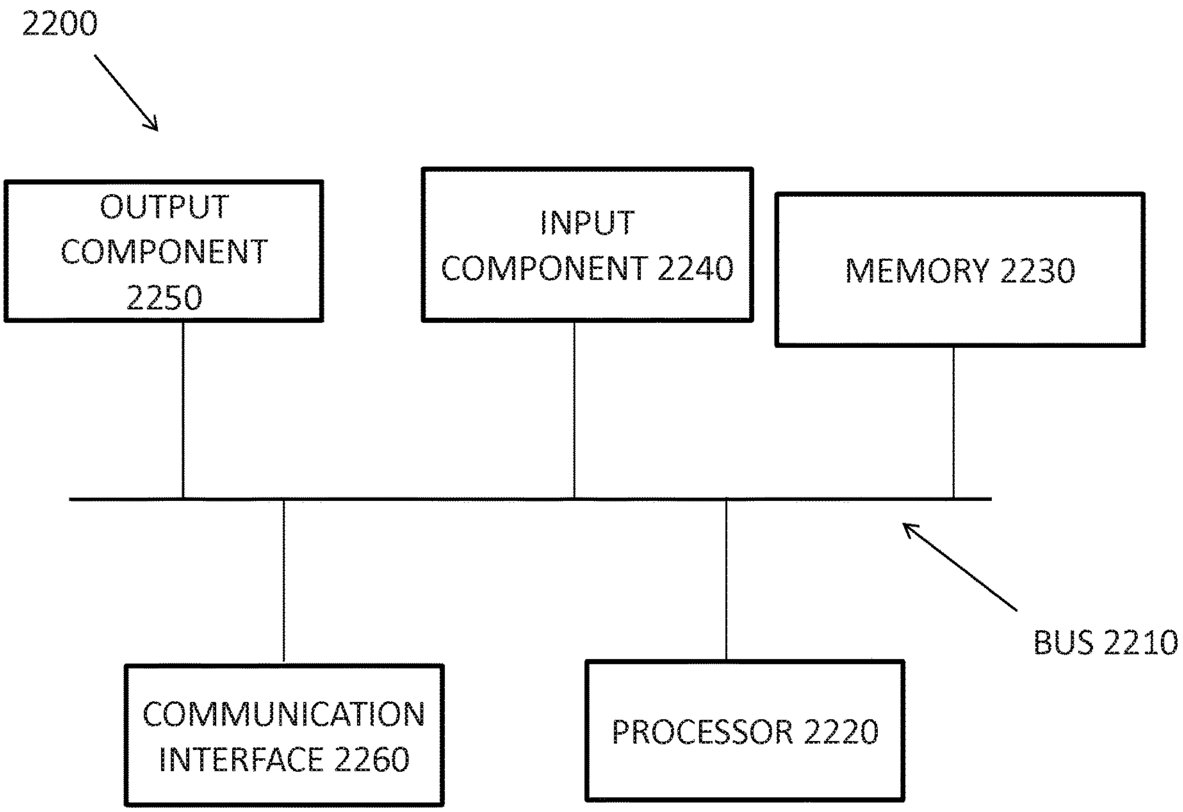
FIG. 22 is a diagram of an example computing device.

FIG. 22 is a diagram of example components of a device 2200. Device 2200 may correspond to user device 2202, user device 2204, and translation system 206. Alternatively, or additionally, user device 2202, user device 2204, and antenna 2106 may include one or more devices 2200 and/or one or more components of device 2200.

As shown in FIG. 22, device 2200 may include a bus 2210, a processor 2220, a memory 2230, an input component 2240, an output component 2250, and a communications interface 2260. In other implementations, device 2200 may contain fewer components, additional components, different components, or differently arranged components than depicted in FIG. 22. Additionally, or alternatively, one or more components of device 2200 may perform one or more tasks described as being performed by one or more other components of device 2200.

Bus 2210 may include a path that permits communications among the components of device 2200. Processor 2220 may include one or more processors, microprocessors, or processing logic (e.g., a field programmable gate array (FPGA) or an application specific integrated circuit (ASIC)) that interprets and executes instructions. Memory 2230 may include any type of dynamic storage device that stores information and instructions, for execution by processor 2220, and/or any type of non-volatile storage device that stores information for use by processor 2220. Input component 2240 may include a mechanism that permits a user to input information to device 2200, such as a keyboard, a keypad, a button, a switch, voice command, etc. Output component 2250 may include a mechanism that outputs information to the user, such as a display, a speaker, one or more light emitting diodes (LEDs), etc.

Communications interface 2260 may include any transceiver-like mechanism that enables device 2200 to communicate with other devices and/or systems. For example, communications interface 2260 may include an Ethernet interface, an optical interface, a coaxial interface, a wireless interface, or the like.

In another implementation, communications interface 2260 may include, for example, a transmitter that may convert baseband signals from processor 2220 to radio frequency (RF) signals and/or a receiver that may convert RF signals to baseband signals. Alternatively, communications interface 2260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 2260 may connect to an antenna assembly (not shown in FIG. 22) for transmission and/or reception of the RF signals. The antenna assembly may include one or more antennas to transmit and/or receive RF signals over the air. The antenna assembly may, for example, receive RF signals from communications interface 2260 and transmit the RF signals over the air, and receive RF signals over the air and provide the RF signals to communications interface 2260. In one implementation, for example, communications interface 2260 may communicate with network 2101.

As will be described in detail below, device 2200 may perform certain operations. Device 2200 may perform these operations in response to processor 2220 executing software instructions (e.g., computer program(s)) contained in a computer-readable medium, such as memory 2230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 2230 may cause processor 2220 to perform processes described herein. Alternatively, hardwired circuitry may be used in place of or in combination with software instructions to implement processes described herein. Thus, implementations described herein are not limited to any specific combination of hardware circuitry and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 22, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 21. Also, it will be understood that any of the various actions can result in any type of electronic information to be displayed in real-time and/or simultaneously on multiple user devices (e.g., similar to user device 202).

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:

three concurrent dual-band optical antennas, wherein:

a first antenna is designed with two simultaneous optical center frequencies at 187 THz and 230 THz with a total length L=3.830 μm, and a second and third antenna are designed at two simultaneous center frequencies at 187 THz and 230 THz with different total lengths of the antennas L=3.820 μm and L=3.800 μm, respectively.

2. The device of claim 1, further comprising:

four parasitic slot elements.

3. The device of claim 1, wherein the device is configured to operate at the nanoscale.

4. The device of claim 1, wherein the device includes plasmonic dual-band antennas configured for nanoscale wireless networks to operate on two distinct optical frequency bands.

* * * * *